United States Patent
Araujo et al.

(10) Patent No.: US 7,111,060 B2
(45) Date of Patent: Sep. 19, 2006

(54) APPARATUS AND ACCOMPANYING METHODS FOR PROVIDING, THROUGH A CENTRALIZED SERVER SITE, A SECURE, COST-EFFECTIVE, WEB-ENABLED, INTEGRATED VIRTUAL OFFICE ENVIRONMENT REMOTELY ACCESSIBLE THROUGH A NETWORK-CONNECTED WEB BROWSER

(75) Inventors: Kenneth S. Araujo, Somerset, NJ (US); Reginald P. Best, Somerset, NJ (US); Christopher P. Douglas, Matawan, NJ (US); Devin J. Heitmueler, Neptune City, NJ (US); Siuling C. Zhang, Stony Brook, NY (US)

(73) Assignee: AEP Networks, Inc., Somerset, NJ (US)

( * ) Notice: Subject to any disclaimer, the term of this patent is extended or adjusted under 35 U.S.C. 154(b) by 855 days.

(21) Appl. No.: 09/808,404

(22) Filed: Mar. 14, 2001

(65) Prior Publication Data

US 2003/0191799 A1 Oct. 9, 2003

Related U.S. Application Data

(60) Provisional application No. 60/189,251, filed on Mar. 14, 2000.

(51) Int. Cl.
*G06F 15/173* (2006.01)
*G06F 15/177* (2006.01)
*G06F 15/16* (2006.01)

(52) U.S. Cl. .................... 709/224; 709/222; 709/223; 709/227; 709/249

(58) Field of Classification Search ........ 709/203–206, 709/218, 219, 227–228, 221–222, 229, 224, 709/223, 249; 379/93.01, 93.21, 211; 713/201, 713/153; 714/4, 25
See application file for complete search history.

(56) References Cited

U.S. PATENT DOCUMENTS

| | | | | |
|---|---|---|---|---|
| 6,023,708 A | * | 2/2000 | Mendez et al. | 707/203 |
| 6,301,339 B1 | * | 10/2001 | Staples et al. | 379/93.01 |
| 6,571,245 B1 | * | 5/2003 | Huang et al. | 709/218 |
| 6,654,784 B1 | * | 11/2003 | Wei | 709/203 |
| 6,691,154 B1 | * | 2/2004 | Zhu et al. | 709/204 |
| 6,725,238 B1 | * | 4/2004 | Auvenshine | 707/200 |

* cited by examiner

*Primary Examiner*—Jeffrey Pwu
(74) *Attorney, Agent, or Firm*—Michaelson & Associates; Peter L. Michaelson

(57) ABSTRACT

Apparatus and accompanying methods for use therein for implementing an integrated, virtual office user environment, through an office server(s), through which a remotely stationed user can access typical office network-based applications, including e-mail, file sharing and hosted thin-client programs, through a remotely located network, e.g., WAN, connected web browser. Specifically, a front end, namely a service enablement platform (SEP), to one or more office servers on a LAN is connected to both the WAN and LAN and acts both as a bridge between the user and his(her) office applications and as a protocol translator to enable bi-directional, web-based, real-time communication to occur between the browser and each such application. The SEP translates user input originating from the browser into application-specific protocols and applies a result to a corresponding office application server.

18 Claims, 20 Drawing Sheets

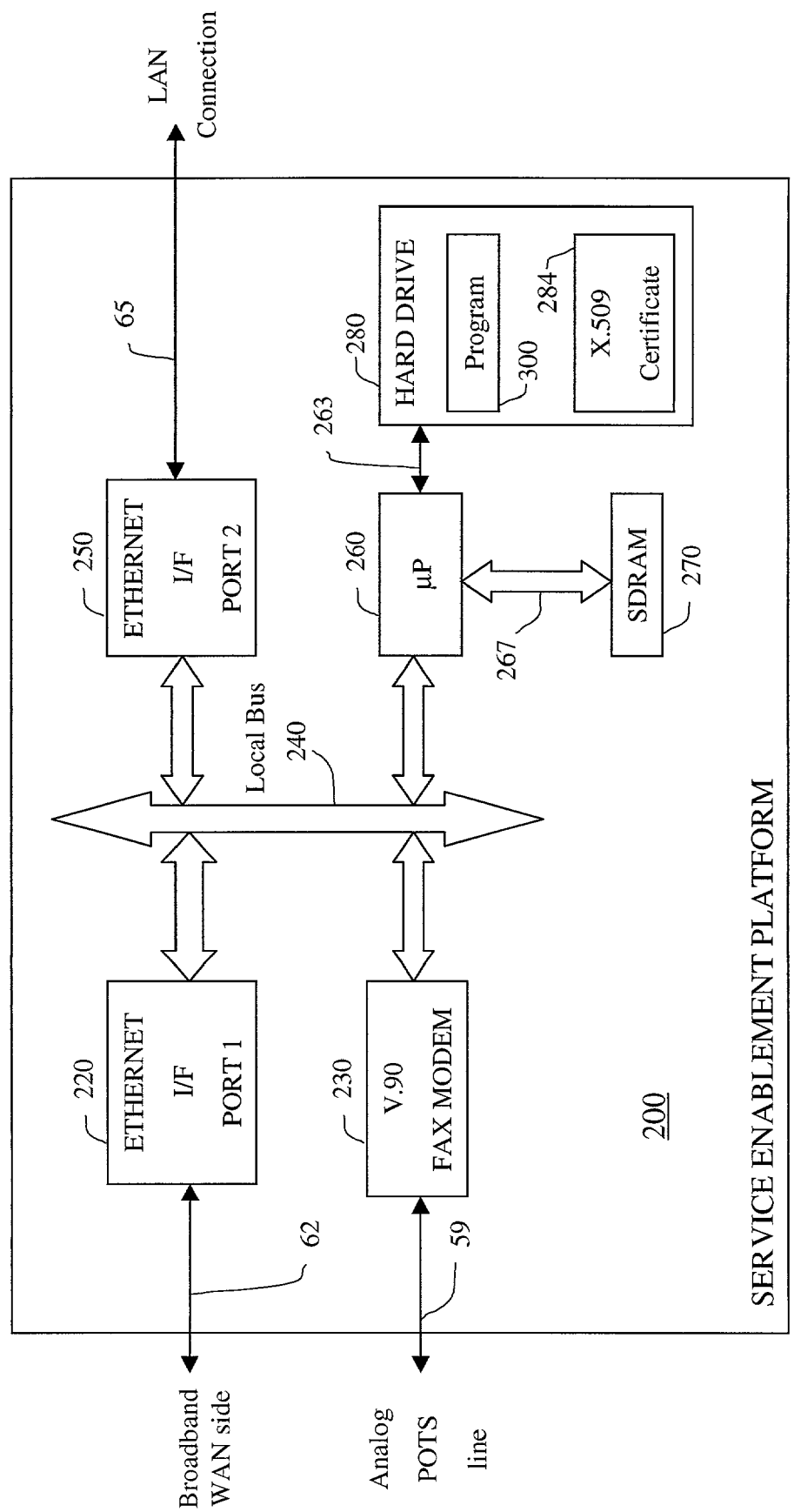

APPARATUS AND ACCOMPANYING METHODS FOR PROVIDING, THROUGH A CENTRALIZED SERVER SITE, A SECURE, COST-EFFECTIVE, WEB-ENABLED, INTEGRATED VIRTUAL OFFICE ENVIRONMENT REMOTELY ACCESSIBLE THROUGH A NETWORK-CONNECTED WEB BROWSER

CLAIM TO PRIORITY

This application claims the benefit of our co-pending United States provisional patent application titled "VIRTUAL OFFICE" filed on Mar. 14, 2000 and assigned Ser. No. 60/189,251.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE DISCLOSURE

1. Field of the Invention

The invention relates to apparatus and accompanying methods for use therein for implementing a secure, cost-effective, web-enabled, integrated, virtual office user environment, through a centralized server(s), through which a remotely stationed user can access typical office network-based applications, including, e.g., e-mail, file sharing and hosted thin-client application programs, through a remotely located network, e.g., WAN, connected web browser, as well as for remotely providing network monitoring and management capabilities. The present invention is particularly, though not exclusively, suited for use in small to medium size organizations which, for economic reasons, do not have adequate in-house computer support (technical and administrative) capabilities.

2. Description of the Prior Art

With laptop personal computers (PCs) having become rather ubiquitous over the last several years, individuals who are away from their office, typically desktop, PCs and hence not in communication with their office networks, because they are either traveling or are at home, often have a continuing need to gain access to those networks. Such access is required if, for no other reasons, than only for those users to transfer files between their laptop PCs and servers on these networks and/or access their network-based e-mail servers (both for receiving incoming and transmitting outgoing messages).

This need is not only shared by many individuals but also by organizations of widely varying size, from large organizations to very small businesses and other groups.

The art teaches various approaches to meet this need. However, they are all deficient in one respect or another. In that regard, none of these approaches offers an effective, integrated solution that readily provides all the functionality obtainable using an office network through one simple remote user interface, such as a web browser.

Specifically, one approach is to simply install appropriate conventional communications software in each client laptop PC and permit its user to access, through a dial-up telephone line, his(her) office network to gain access to the network server for file transfer and e-mail functionality. All application programs would reside on and locally execute on the client laptop PC. While this approach is quite simple, nevertheless it necessitates that each and every such application program be installed, configured and then maintained on that PC. Consequently, over time, this approach, particularly in view of the on-going support costs of the installed application programs, can become quite expensive.

Another approach involves using a traditional virtual private network (VPN) to provide wide area network (WAN) connectivity from a user's remote or home location to an office local area network (LAN). A VPN WAN connection implements a so-called OSI layer 2 extension or "conduit" of the office network itself between the LAN and the user's remote/home location. A remote client PC, connected through a VPN to an office LAN, locally appears on the LAN, as far as that user is concerned, as if that client PC were directly connected to it. In essence, for packets destined from the client PC to the LAN, a VPN connection therebetween involves, at a near end of the VPN connection, encapsulating outgoing OSI layer 3 packets at the client PC into layer 2 IP (Internet protocol) packets and transmitting those layer 2 packets over the VPN connection (in effect tunneling those layer 3 packets through the VPN connection), and subsequently, at a remote (LAN) end of the VPN connection, disassembling the layer 2 packets to yield the layer 3 packets and applying the resulting layer 3 packets onto the LAN for carriage to their ultimate destination, such as a network server. The opposite operation occurs in reverse for packets emanating from LAN, e.g., the server, and destined, over the VPN connection, to the remote client PC. Since the layer 2 packet tunneling is totally transparent to both the LAN and the client PC, advantageously the client PC can provide the same level of functionality to its user as if that PC were directly connected to the LAN.

Historically, a VPN connection required special, expensive VPN termination equipment located at each end of the connection, or required special client software to be installed and configured at the client machine. This equipment was rather expensive to acquire, and proved to be rather tedious to properly configure and hence costly to administer and maintain, particularly for those small to medium sized organizations that lacked adequate in-house technical support personnel.

In particular, at the remote client site, a so-called VPN terminator (also referred to as a "client-site VPN router") was connected to a client PC to bi-directionally interface that PC to the VPN connection. This terminator provided layer 2 packet processing as well as appropriate packet encryption/decryption functionality. However, such a terminator, which included special-purpose software, was generally quite expensive to procure and needed to be installed and properly configured for its particular client PC—the latter entailing significant costs in both time and money. To mitigate the cost somewhat, various currently available PC operating systems (O/S's) now provide VPN support features, and, as an alternative, VPN vendors have built client VPN software that runs on the client machine and interacts with that vendors' own VPN server or with VPN servers from other vendors. Such client VPN software has been built to work with conventional PC O/S's such as Windows 98, Windows NT, Windows 2000, etc. However, PC O/S-based or client software based VPN support requires considerable packet processing (e.g., for packet encapsulation and disassembly, and cryptographic processing), which disadvantageously imposes a significant processing burden on the PC—though this burden may be acceptable for a home PC with a relatively light processing load, rather than a remote PC connected to an office network.

Furthermore, VPN services must be very secure. Unfortunately, until rather recently such PC O/S-based VPN support used a rather small key size, such as 40-bits, which generally does not provide sufficient security against third-party intrusion. While relatively new PC-based operating systems have become available that exhibit significantly increased VPN security, through use of triple DES and IPsec features—such as MICROSOFT® WINDOWS® 2000 O/S ("Windows 2000" is a trademark of the Microsoft Corporation of Redmond, Wash.), this support still presents a considerable processing load to the PC; hence, denigrating PC performance, specifically processing throughput.

Moreover, such PC operating systems, whether those exhibiting increased VPN security or not, still do not provide requisite reliability.

As such, to provide VPN connectivity with required levels of security and reliability without imposing an undue processing load on the client PC, use of a separate dedicated client-site VPN terminator—even in view of its expense—is still strongly favored in practice.

Not only is expensive, specialized VPN equipment required at the client site (or alternatives such as OS-based VPN support or client software packages, both with their accompanying problems, need to be used), but it is also necessary, to an even greater extent, at the LAN (central) site. At the LAN site, VPN support requires installation and configuration of an office-site VPN router. Office-site routers are considerably more expensive than client-site VPN routers for the simple reason that the processing circuitry in the former, which implements the necessary cryptographic and packet processing operations, is sized based on a number of users that need to be simultaneously supported. Each user is allocated a certain slice of the available processing capacity. Even if such a router is sized to support just a few simultaneous remote users on the LAN, its cost can easily amount to several thousands of dollars, with the cost rapidly escalating as user load and hence necessary processing capacity of the VPN router increased. Recently, server operating systems, such as the MICROSOFT® WINDOWS® 2000 server O/S, have become available that incorporate multi-user VPN support with sufficient security features; however, such support drains considerable processing resources from the server and still is insufficiently reliable. Moreover, if such a server O/S-based approach is used, counterpart client-site software, such as the Windows 2000 O/S, must be installed and properly configured on each client PC, which, if a large number of remote users exists, can be rather expensive and time consuming.

Therefore, in view of the relatively high cost involved, most small to medium sized organizations were and continue to be unable to afford the use of VPN connectivity, thus precluding themselves from providing secure remote office access to their internal networks and various business efficiencies and productivity increases that could have gained thereby.

A further, though totally different approach, evolved in the art for providing remote connectivity to an office LAN. This approach, predicated on an "application service provider" (ASP) model, involves installing specialized server software, such as "Metaframe" software available from Citrix Corporation, in the network server and an "ICA" client program in each client PC. Through the Metaframe program, the network server situated on the LAN would function as an ASP by hosting multiple virtual sessions of a given application program executing on the server, in effect implementing multiple virtual machines, to various different remotely located client PCs. Each remote client, running the ICA client program, would access, over, e.g., a WAN connection, a desired thin-client application hosted at the LAN-based server and establish a separate application session. The ICA client would communicate mouse clicks and keystrokes entered by a user stationed at the client PC, over the WAN connection, to the Metaframe program executing in the server which, in turn, would provide screen shots back to the client PC for local display to a user stationed thereat. This information would be carried between the client and server using an "ICA" protocol.

As PC manufacturers began equipping their PCs with client web browsers as standard issue software as well as users downloading such browsers for free from various software manufacturers, the Metaframe program evolved to permit remote browser-based web access, with the ICA client being replaced by the use of a resident client browser in the PC.

The concept of providing multiple virtual machines is also provided through "Windows Terminal Services" (WTS) software currently available from the Microsoft Corporation ("WINDOWS®" is a trademark of the Microsoft Corporation) for Windows NT 4 and Windows 2000 server operating systems, with client-server communication of screen shots, keystrokes and mouse clicks being carried to and from WTS using "RDP ('Remote Desktop Protocol' defined by Microsoft Corporation and based on the ANSI T.128 standard)", rather than an "ICA" protocol. Again, WTS, like the Metaframe program, still carries a considerable processing burden.

Unfortunately, with this ASP-based approach, the client PC did not appear as if it were connected to the LAN. As such, while this approach did allow remote application execution, it did not accommodate remote access of other essential office network-based functionality, such as file sharing and e-mail. Hence, this approach was seen as being rather "one-sided".

The art supplemented this ASP-based approach by incorporating a VPN (layer 2) connection between the LAN and client PC. This, in turn, provided added client functionality inasmuch as the client PC appeared as though it was on the remote LAN. However, this approach not only proved to be rather inconvenient to use but also, due to its VPN connectivity and for the reasons set forth above, rather expensive.

Specifically, a VPN server was connected to the LAN and a VPN router (or VPN terminator) was connected to each client PC, or each client PC used OS-based VPN support, or special client software had to be installed on each PC. The Metaframe program or WTS executed on the server which provided access, through a client browser or a special client application program, to a server-hosted virtual application session. By virtue of the VPN connection, the user at the client PC could remotely execute server-hosted thin-client applications, with the client PC appearing as if it were directly connected to the LAN. Unfortunately, this approach, being hampered by the constraints of the Metaframe software or WTS, only accommodated thin-client applications through the browser, and hence was just as "one sided". No other network functionality, such as e-mail or shared file access, was accommodated through the browser; hence, this approach proved somewhat inconvenient to use. Moreover, the high cost of the associated VPN client-site and office-site servers principally dissuaded many small to medium size organizations from using this approach.

To off-load some of the processing burden from the LAN server running WTS, a two-tier approach recently appeared in the art through which a specialized processing system was inserted between the server and a WAN connection. This processor converted RDP packets associated with WTS into AIP packets (AIP is a proprietary protocol owned by Tarantella Inc. of Santa Cruz, Calif.) or to some other less bandwidth-intensive protocol and conducted client application communication (screen shots, keystrokes and mouse clicks) with the far-end client PC through either of the latter protocols. ICA provides similar bandwidth conserving functionality. Alternatively, communication in native RDP may be used instead. In any event, the client PC interacted with the processing system through either a specialized client application program or a web browser executing an appropriate JAVA applet ("JAVA" is a trademark of Sun Microsystems, Inc. of Palo Alto, Calif.). While this scheme relieved some of the load on the server, it still suffered the same deficiency as an ASP approach: it was not integrated and thus failed to provide through one single user interface, such as a browser, all the functionality which that user would have if his(her) client PC were directly connected to his(her) office LAN.

In view of the increasing costs of software acquisition, client installation and maintenance of client application programs, internally centralized ASP-based remote application hosting may well become an attractive alternative for business users.

However, adequate security remains a concern, particularly for small to medium size businesses that seek to implement an ASP-approach using the Win 2000 O/S or similar system. In that regard, WTS provides cryptography, though at a 168-bit level, through use of a symmetric key. While each RDP message from a network server to a remote client is sufficiently encrypted by WTS to preclude its brute-force cryptanalysis, shared symmetric keys are vulnerable to third party discovery for the simple reason that the secret key has to be distributed to the parties using it, and thus can be obtained by a malicious party. Since the Windows 2000 WTS approach does not involve the use of certificates, it is vulnerable to "man-in-the-middle" attacks from malicious parties that have obtained the symmetric key. In symmetric-key cryptography, both sides, here being the remote client PC and the server, utilize the same key. As such, if a third-party interloper, a so-called "man in the middle" that had previously obtained the symmetric key, were to intercept communications, that party through its computer, could pose as the server to the client machine, and as the client to the server machine. However, that party would thus be privy to all communications attempted between the client and the server, and thus have access to information that could be highly proprietary. That party could readily decrypt each message it received from one end and then alter the message contents as it saw fit, and transmit a modified message to the other end, thus potentially causing considerable mischief. Since WTS provides no effective protection to so-called "man in the middle" attacks, inasmuch as its symmetric key scheme does not involve the use of certificates and public keys cryptography, use of WTS under the WIN 2000 O/S is still not viewed by many organizations as offering a sufficiently attractive or secure solution to properly support such centralized thin-client application program hosting.

Therefore, a need exists in the art for a technique, specifically apparatus and methods for use therein, that provides secure, but integrated network functionality through a remote WAN connection between a remote client PC and a server based on an office LAN. Such a technique should provide all network functionality, including, e.g., thin-client application program hosting, file sharing and e-mail, through a single, commonly available user interface, such as a web browser, as if that client PC were connected directly to the LAN. The security should be such as to substantially eliminate potential "man in the middle" attacks or other such third-party intrusions. Furthermore, through such a technique, the client PC should appear as if it were directly connected to the LAN.

While such a technique could utilize a VPN connection, it should function with preferably far less costly alternatives, such as interacting directly with transport schemes such as DSL (digital subscriber line) or other relatively low-cost, high-speed digital access modalities. Also, such a technique should be remotely administered and supported, particularly when employed in those organizations which can not afford to maintain adequate in-house computer support capabilities.

Such a technique, were it to exist, would likely be very attractive to many organizations, including small and medium sized businesses: (a) to permit effective internal ASP-based (centralized) thin-client application program hosting for remote client connectivity, with resulting cost savings to those organizations in application procurement as well as through centralized administration and maintenance of those application programs, and (b) through its use, to yield increased efficiency and productivity by providing remote access for individual users to all their office network-based functionality.

SUMMARY OF THE INVENTION

Advantageously, our present invention satisfies this need and overcomes the deficiencies in the art by providing a front-end, in the form of a service enablement platform (SEP), to a LAN-connected office server(s) for implementing secure, remote web-based access, through a WAN-connected user browser, for a user situated at a remote client computer (e.g., remote laptop PC). Through the SEP, the remote user is provided with essentially, if not completely, the same network-based office functionality implemented by the office server as if the remote computer were directly connected to that LAN.

In accordance with our inventive teachings, the SEP is situated between the LAN and the WAN-connected user. In use, the SEP acts both as a bridge between the remote user and his(her) office applications and as a protocol translator to enable bi-directional, web-based, real-time communication to occur between the user browser and each of these office applications. In that regard, the SEP provides bi-directional protocol translation to exchange necessary information (data and user interactions) between, on the one hand, application-specific protocols, such as MICROSOFT®-RDP, IMAP4 (Internet Mail Access Protocol version 4) or MICROSOFT® .NET SMB (Server Message Block), to communicate with office-based client application, e-mail and file servers; and, on the other hand, HTML, in conjunction with HTTP, as required by the user browser or some other protocol, e.g., AIP or the like, used by an applet within the browser.

The SEP establishes a LAN connection for the remote user that, as far as that user is concerned, places the remote PC directly on the LAN. By virtue of such a connection, the remote user can, e.g.: (a) send and receive e-mail through the office e-mail server and manipulate his(her) e-mail stored thereon, (b) access, through the office file server, all his(her)

and other shared files stored on and accessible through the LAN as well as transfer files, (c) remotely execute, through the thin-client application server any of his(her) hosted client application programs stored thereon, with real-time results of each of these operations being displayed in HTML form on the user browser.

Specifically, the SEP includes a separate client application module for each basic office function: file sharing, e-mail and thin-client application hosting. Each such module accepts as input, in one direction, user interaction data, in the form of URI/URL selection, form input, etc., user mouse clicks and keystrokes provided in HTML form (or in an intermediate transmission protocol, such as AIP), and generates a message, in the appropriate application protocol, containing this data to a corresponding office application. Each such module also operates in the reverse direction by accepting output information, such as a screen shot or data list, produced by its corresponding office application and converting that information, from its application protocol, into a graphical HTML page (or in the intermediate transmission protocol) for transmission to and rendering as a web page by the user browser. Thus, each of these modules acts both as a bridge between the user and a specific one of his(her) office applications and as a protocol translator to enable bi-directional, web-based, real-time communication to occur between the user browser and that particular office application.

Furthermore, since user access to the SEP is provided on an authenticated basis, through use of a unique, pre-defined and pre-stored certificate, rather than through use of a symmetric key, the present invention is generally not as susceptible to third-party intrusion through so-called "man in the middle" attacks.

In accordance with a feature of our invention, while the principal office-based applications are file sharing, e-mail and thin-client application program hosting, our invention can readily and easily accommodate web-based, secure, remote user access to other additional office-based applications by merely incorporating a corresponding client application module for each such additional office application to provide required bi-directional, real-time protocol translation for both incoming user interaction data to that office application and output data generated by that office application.

BRIEF DESCRIPTION OF THE DRAWINGS

The teachings of the present invention can be readily understood by considering the following detailed description in conjunction with the accompanying drawings, in which:

FIG. 2 depicts a high-level block diagram of service enablement platform (SEP) 200, which is used to implement our present invention and as shown in FIG. 1;

To facilitate understanding, identical reference numerals have been used, where possible, to designate identical elements that are common to the figures.

DETAILED DESCRIPTION

After considering the following description, those skilled in the art will clearly realize that the teachings of our present invention can be utilized in any of a wide number of different client-server networked processing architectures that support remote access from a client PC to an office server. In essence, our invention supports remote, secure, web-based user access to network-supported and hosted office processing functions, including client application programs, e-mail and file sharing, to a remotely located user with the same capabilities and essentially the same ease of use as if his(her) computer were directly connected to an office network rather than through a wide area network (WAN) or other remote connection; hence, providing that user with a so-called "virtual office". Advantageously, our inventive apparatus effectively implements a front-end to the office server, regardless of whether that office server is implemented by a single machine (computer) or multiple machines, and regardless of whether those machines are co-located or not, as long as they are interconnected to the apparatus through an appropriate network. If the office server is implemented by multiple inter-networked machines—as is often the case in medium or large sized organizations, each of these machines can handle one or more specific office processing tasks, e.g., client application program hosting, e-mail serving and/or file serving. Alternatively, for small organizations with limited processing equipment, either our inventive apparatus itself, through its internal processing capability, can implement all these tasks or can serve as a front-end to a single separate machine (computer) which does so. For the sake of simplicity, we will describe our invention for use in an small office environment where either the apparatus serves as a front-end to a single machine situated at an office location that collectively implements all the necessary office processing tasks or additionally implements all those tasks itself. Furthermore, although our invention can readily support simultaneous access by multiple remotely located clients, again for simplicity, we will describe our invention in the context of use with only one such client at a time. Clearly, based on the ensuing description, those skilled in the art can readily appreciate how our inventive architecture can simultaneously accommodate multiple clients and can be scaled upward to simultaneously handle relatively large numbers of such clients.

Figure 1:
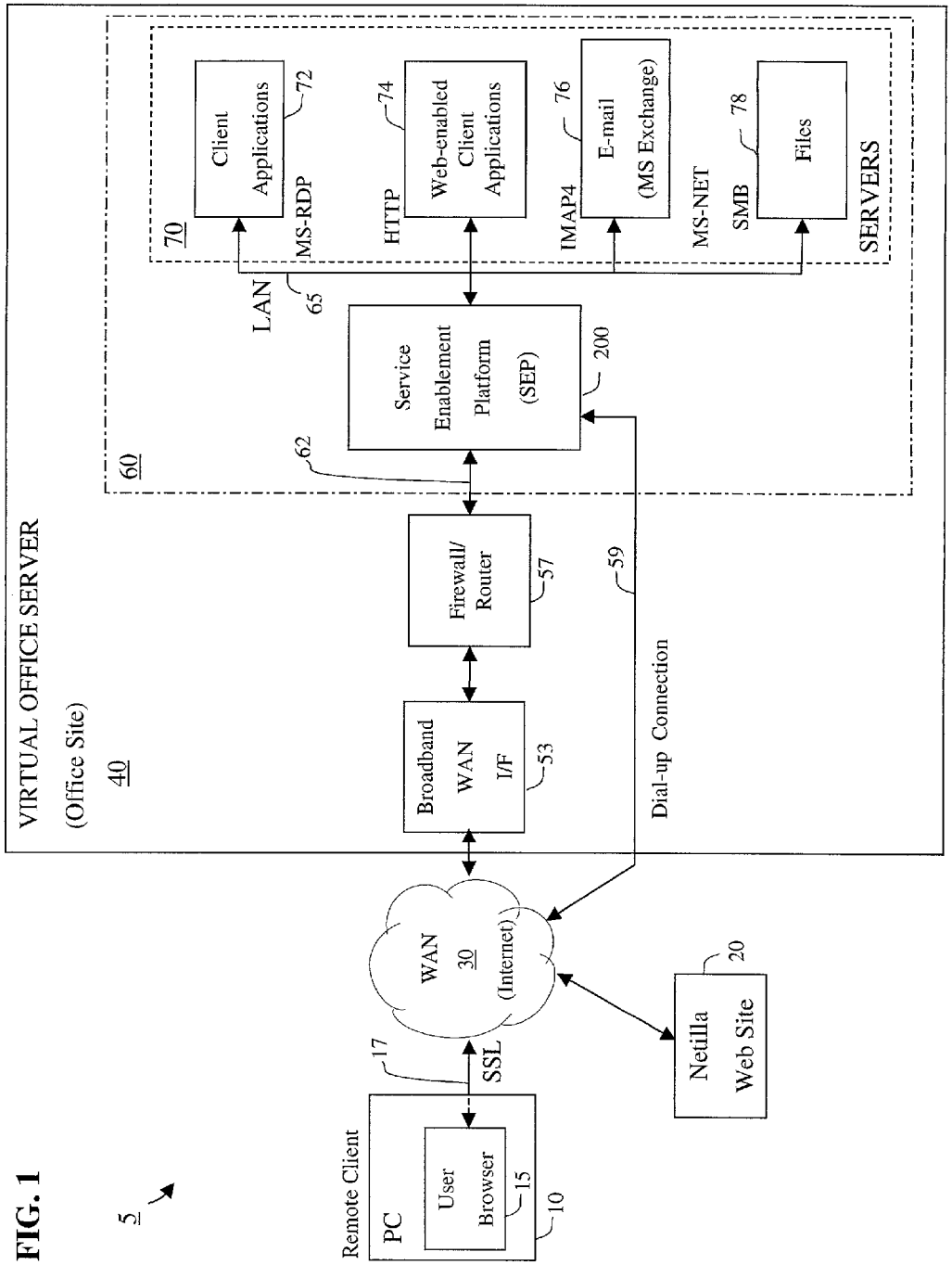
FIG. 1 depicts an overall high-level block diagram of a relatively simple and illustrative networked apparatus that embodies the teachings of our present invention and which would be typically used in conjunction with a relatively small office.

FIG. 1 depicts an overall high-level block diagram of illustrative networked environment 5 that embodies the teachings of our present invention and is particularly suited for use in conjunction with a small office.

As shown, this environment includes remote client 10, that is typically a personal computer (PC) generally a laptop, connected through wide area network (WAN) 30, to office server 40 situated at an office site. WAN 30 can be implemented by a publicly accessible network, such as the Internet, or a private network. Connectivity to the WAN is provided through any relatively high-speed (broadband) access modality such as, e.g., digital subscriber line (DSL), cable modem, integrated service digital network (ISDN), fractional T1 or even a T1 line. Alternatively, remote dial-up analog modem access can be used instead, though end-to-end transport delays, in view of a relatively slow communication speed provided by such a modem, may markedly slow system response as perceived by a user situated at PC 10.

Our invention advantageously utilizes web-based access to office applications, with those applications being remotely hosted by virtual office server 40 and encrypted communication provided through conventional secure sockets layer (SSL) capability supported within the browser. As such, client 10 contains conventional user browser 15. Advantageously, since all the office applications are hosted remotely, there is no need to install, configure or maintain any user application programs, other than a web browser, on remote client 10; thereby, dramatically reducing cost of ownership of the client PC.

Virtual office server 40 contains conventional broadband WAN interface 53, firewall/router 57, service enablement platform (SEP) 200, and server 70. Interface 53 is conventional in nature and provides high-speed network access. It can take the form of, e.g., a cable modem, a DSL interface, an ISDN terminal adapter or a fractional/full T1 interface. The specific modality of peered-network access used by both client PC 10 and interface 53 is not critical provided that the chosen modality can support sufficiently high access speeds between the remote client and server 40. Firewall/router 57 is conventional in nature and attempts to isolate server 40 from unauthorized network-based attacks as well as provide outgoing and incoming network routing capability to and from WAN 30. While interface 53 and firewall/router 57 are both shown as being external to the SEP, interface 53 can be located internal to the SEP as, to the extent needed, can firewall/router 57. From a network perspective, SEP 200 is situated between WAN 30 (via broadband interface 53 and firewall/router 57) and local area network (LAN) 65.

In accordance with our inventive teachings and as described in considerable detail below, SEP 200 provides a front end to server 70 for implementing secure, remote, web-based access, through browser 15, by a user situated at client 10 to the network-based office functionality implemented by server 70 and to the same extent as if client PC 10 were directly connected to LAN 65. Server 70 resides on LAN 65 to collectively implement, through separate internal LAN accessible application servers, various office processing applications (tasks) including, through client applications server 72, thin-client hosted application programs; through web-enabled application server 74, remotely-hosted web-enabled thin-client application programs; through e-mail server 76, e-mail messaging; and, through file server 78, shared file access. Each of these servers is conventional, with E-mail server 76 being implemented, for example, by a MICROSOFT® EXCHANGE™ server ("MICROSOFT® EXCHANGE™" is a trademark of Microsoft Corporation of Redmond, Wash.). As noted, in small offices, server 70 is typically implemented by a single server computer. Alternatively, rather than using two separate physical computers, server 70 and SEP 200 can be collectively implemented, as indicated by dot-dashed line 60, on one single physical computer—with the necessary processing needed to implement server 70 being provided by SEP 200. However, to facilitate understanding, we will depict SEP 200, in terms of its functionality, separate from that of server 70 or any of the hosted applications and servers executing thereon.

Furthermore, during initial configuration of office server 40, SEP 200 establishes a dial-up connection, as symbolized by line 59, via WAN 30, to administrative web site 20 (specifically a web site operated by Netilla Networks Inc., which is the present assignee thereof) through which a unique X.509 digital certificate is downloaded to and stored on SEP 200, along with other configuration information, such as, e.g., necessary IP addresses. This certificate is used to provide secure conventional, encrypted, authenticated communication that is substantially immune to "man in the middle" attacks. Since the manner through which SEP 200 utilizes the certificate is conventional, as is the use of SSL by browser 15, we will not address these aspects in any detail. Once this certificate and configuration information has been provided over connection 59, SEP 200 establishes a web-based (HTTP) connection to web site 20 to complete its set-up procedure. SEP 200, once fully configured and functioning in a network environment, continually monitors the state of its network connections, both to WAN 30 and LAN 65, as well as the state of LAN 65 and the various application servers (whether executing in a separate physical computer or on the same computer that implements SEP 200), and provides associated maintenance and status information back to a server (not shown) associated with web site 20, by establishing a dial-up connection to WAN 30 via line 59, for purposes of remote monitoring, problem diagnosis and routine maintenance. Since none of these particular functions is relevant to the present invention, these functions will not be discussed in any further detail.

Figure 15:
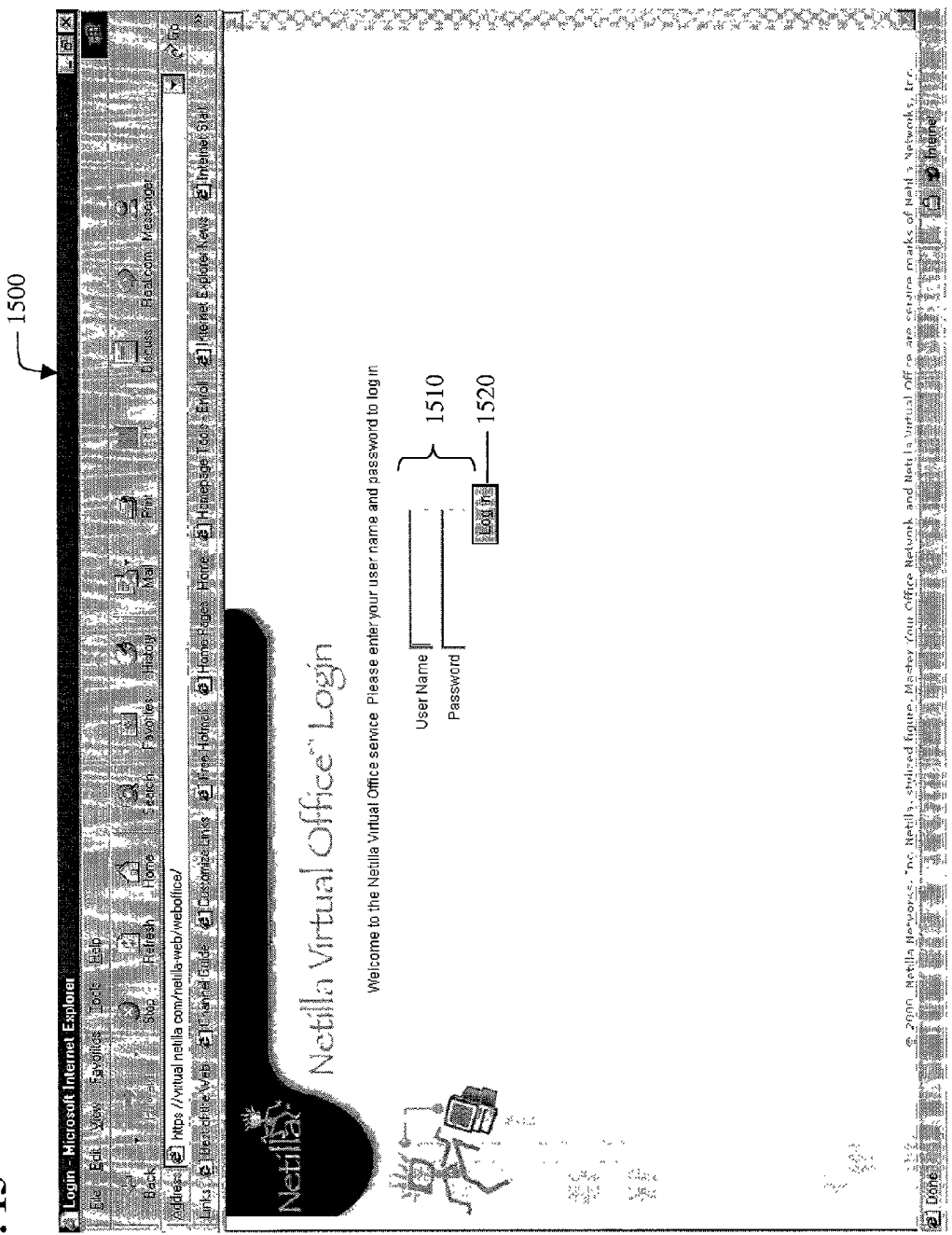
FIG. 15 depicts actual screen shot 1500 of a typical graphical display screen rendered at user browser 15, shown in FIG. 1, through which a remote user logs onto his(her) virtual office capability provided by the present invention.

Once SEP 200 is fully functioning in its network environment, a user situated at his(her) PC can readily and remotely access his(her) office network-based applications by simply establishing a secure web (HTTPS) connection to a web server implemented on SEP 200. To do so, the user enters, through browser 15, a web address associated with this server. Once the connection is established, a web page, as shown in screen shot 1500 for a typical graphical display depicted in FIG. 15, is downloaded by SEP 200 to the user browser through which, once rendered by the browser, the user then enters his(her) username and password to log on to virtual office capability provided by SEP 200. After the user successfully logs in by entering his(her) username and password in fields 1510 and clicking on "Log In" button 1520, a session begins through which a web page is downloaded by SEP 200, as shown in FIG. 1, and displayed on the browser through which several icons, illustratively tabs, are displayed: "My Files", "My E-mail", "My Apps" and "My Admin" (such as those appearing in screen shots 1600, 1700 and 1800 of the displays shown in FIGS. 16, 17 and 18; all of which are discussed in detail below). The user can then click on any of these icons, which, once communicated back to SEP 200, will cause the SEP 200 to launch the associated office application (or administrative function for the "My Admin" tab), generate an HTML file for a graphical display produced by that application, and then download the HTML file to browser 15, for local rendering thereat. During the web session, browser 15 communicates user form input and URI (uniform resource identifier)/URL (uniform resource locator) selection via HTTP requests to SEP 200 which processes this input and provides an appropriate display back to the browser. In addition, for application support, an efficient protocol such as AIP (or the like) is used to transfer user keystrokes and mouse clicks from a window on the remote PC representing an application executing on a remote server to SEP 200, which then relays that user interaction data to the application server via RDP for processing. Note that RDP itself could have been used between the remote browser and SEP 200, but use of AIP or a similar protocol provides more efficient bandwidth utilization than does RDP. The user can readily move between one remote office application to the next by simply clicking on the associated icon.

In doing so, SEP 200 (see FIG. 1) establishes a LAN connection for the remote user that, as far as that user is concerned, places remote client 10 directly on the LAN. By virtue of such a connection, the remote user can, e.g.: (a) send and receive e-mail through server 76 and manipulate his(her) e-mail stored thereon, (b) access, through file server 78, all his(her) files, as well as other shared files, stored on and accessible through LAN 65, (c) remotely execute, through application server 72, any of his(her) thin-client applications hosted thereon, as well as through server 74 remotely execute any of his(her) thin-client web-based applications hosted there, with real-time results of each of these operations being displayed in HTML form on browser 15. Application server 72 receives user mouse clicks and keystroke data and provides user screen shot displays through use of MICROSOFT® RDP (remote desktop protocol). Web-enabled application server 74 communicates client application information using HTTP. E-mail server 76 utilizes a conventional IMAP4 protocol; while file server 78 communicates user information using MICROSOFT® .NET technology Simplified Message Block (SMB) data (to implement MICROSOFT® .NET technology-BIOS functionality). Note, that while SMB and IMAP4 were shown here as examples, other protocols such as Novell Netware and the POP3 (Post Office Protocol 3) are usable as well.

In essence, as the reader can appreciate, SEP 200 acts both as a bridge between the user and his(her) office applications and as a protocol translator to enable bi-directional, web-based, real-time communication to occur between user browser 15 and each of these office applications. In that regard, the SEP provides bi-directional protocol translation to exchange necessary information (data and user interactions) between, on the one hand, MICROSOFT®-RDP, IMAP4 or MICROSOFT® .NET SMB to communicate with office application servers 72, 76 or 78, respectively; and, on the other hand, HTML and HTTP as required by user browser 15 for non-thin-client applications, and AIP, or a similar protocol, for thin-client control information, or for thin-client user interaction data transfer (i.e., mouse clicks, keystrokes, control data).

Figure 14:
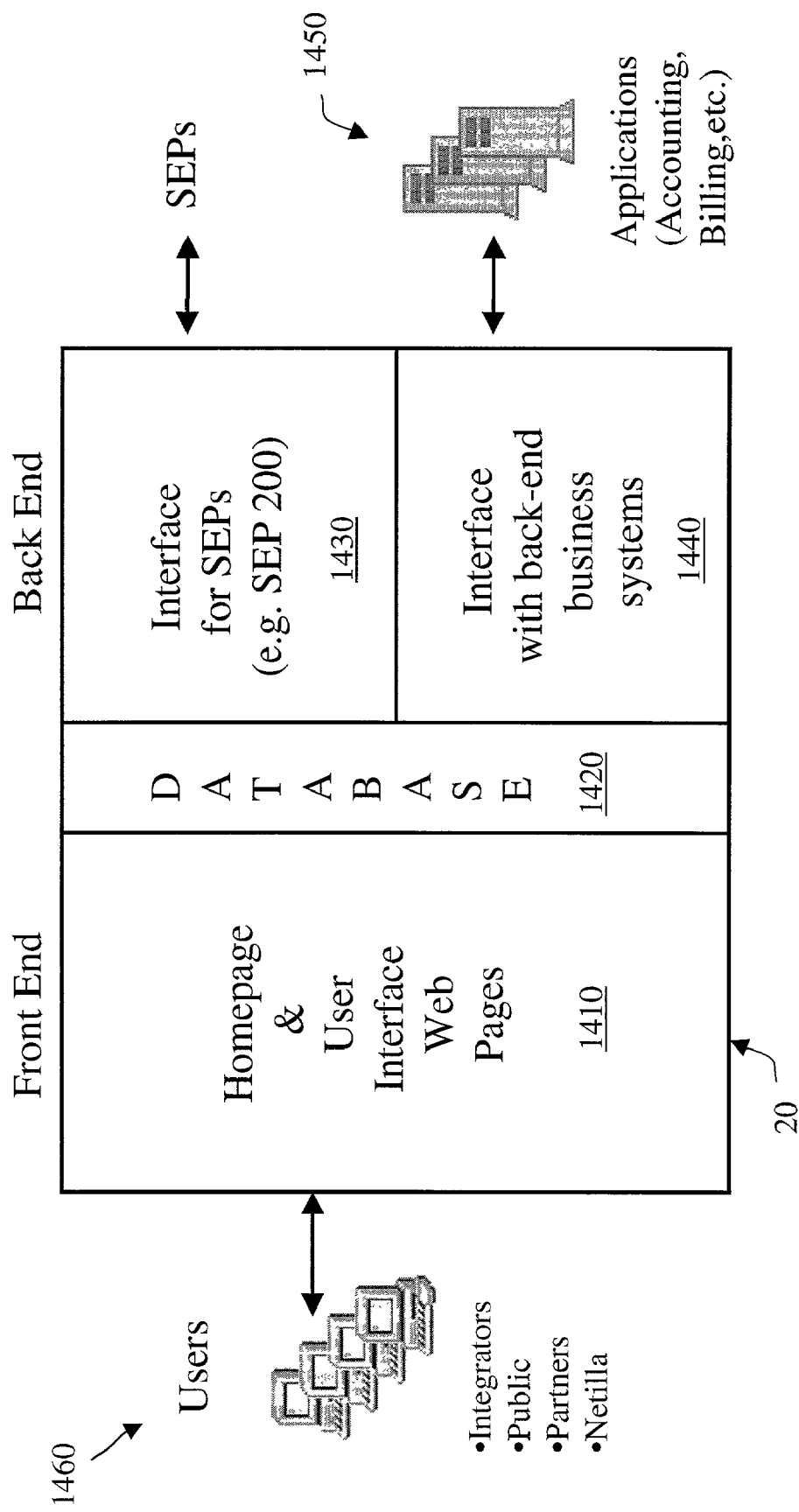
FIG. 14 shows a highly-simplified, high-level block diagram of administrative web site 20 shown in FIG. 1.

FIG. 14 depicts a highly simplified, high-level block diagram of administrative web site 20.

As shown, site 20 is formed of a front-end portion that provides homepage and user interface web pages, database 1420 and a back-end portion having interfaces 1430 and 1440.

Front-end portion 1410 provides a home page and user interface which permits users 1460 to access this site. These users include appropriate Netilla Networks Inc. technical personnel (Netilla Networks Inc. is the present assignee hereof; hereinafter referred to as "Netilla") as well authorized third-parties, such as Netilla partners (e.g., resellers), system integrators and installers, to log onto site 20, on a secure, though restricted basis (depending on the person seeking access). Once appropriate username and password information is entered, each such user gains access for purposes of configuring and determining operational status of any SEP for which (s)he is then providing technical assistance or is responsible. In addition, members of the public can access certain web pages associated with site 20 that provide general information regarding the services currently offered by Netilla and other related information posted on that site. Database 1420, which interacts with both the front- and back-end portions of site 20, stores information for each SEP then in service, alarm reports generated by each such SEP and other related status as provided by that SEP, configuration and maintenance information for that SEP, as well as information (such as user name and password) to permit appropriate access to certain secure areas of the site by Netilla technical personnel as well as each authorized third-party user, i.e., resellers, installers and system integrators. Interface 1430 communicates with individual SEPs (of which, for simplicity, only one SEP 200 is shown in FIG. 1) in order to permit Netilla technical personnel or an authorized third-party to change configuration information, e.g., a profile, stored on a particular SEP and to instruct web site 20 to send such changed information to this particular SEP. This information will be stored within database 1420 and then sent, via this interface, to that SEP. Interface 1440, utilizing information stored within database 1420, communicates with conventional back-end business applications, such as accounting and billing systems 1450, to, among other aspects, establish a new account for a SEP to be or then being installed, modify an existing account and periodically bill an appropriate party, such as a third-party reseller, for use of each SEP for which that party is responsible.

FIG. 2 depicts a high-level block diagram of service enablement platform (SEP) 200. Though SEP 200 is depicted with a particular and rather simple architecture, it can alternatively be implemented by nearly any commercially available, general-purpose personal computer, workstation or server, providing it is equipped with two different and distinct Ethernet ports and a modem.

As shown, SEP 200 contains Ethernet I/F ports 220 and 250 (also referred to as Ethernet ports 1 and 2), V.90 Fax modem 230, and microprocessor 260, all interconnected by local bus 240. Microprocessor 260, which is illustratively any conventional Intel Pentium grade processor or equivalent (having a clock speed of, e.g., 300 MHz or higher) (Pentium is a trademark of Intel Corporation of Santa Clara, Calif.), is itself connected, through bus 267, to memory 270 and via bus 263 to hard drive 280. Memory 270 is illustratively synchronous dynamic random access memory (SDRAM). Hard drive 280 stores program 300 and X.509 certificate 284. During operation of SEP 200, segments of program 300, to the extent needed, are copied from hard drive 280 into memory 270 from which those segments are executed. Memory 270, being volatile, also stores temporary data, as required during program execution.

Ethernet ports 1 and 2 permit the SEP to be situated in series, via LAN connection 65, between office server 70 (see FIG. 1), and, via an Ethernet connection symbolized by line 62, to a broadband connection to the WAN, via interface 53 (through, e.g., firewall/router 57). As such, SEP 200 can intercept incoming network messages incoming from WAN 30, perform required protocol conversion and IP address translation on each such message and route that message to a correct office application server on LAN 65, and provide the opposite functionality in a reverse direction for outgoing messages.

Fax modem 230 provides analog dial-up connectivity over line 59 for use, as described above, during installation of SEP 200; for communicating monitoring and status information back to administrative web site 20, and as a back-up data connection in the event the broadband connection fails. The fax capability of the modem is not used by SEP 200 unless a specific hosted user (thin-client) application program requests it.

Figure 3A:
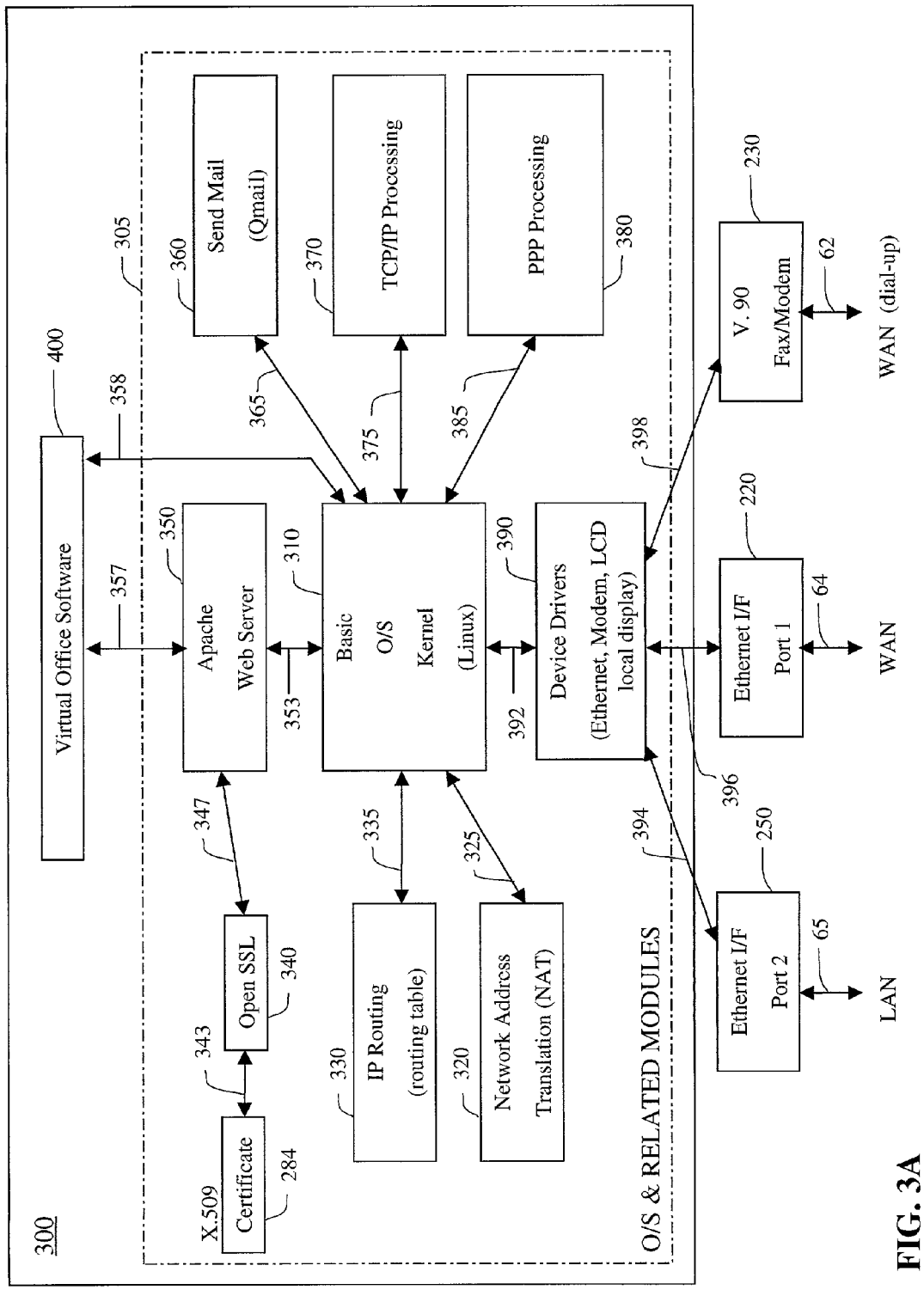
FIG. 3A depicts a high-level block diagram of software 300 that executes within SEP 200 shown in FIG. 2.

FIG. 3A depicts a high-level block diagram of software 300 that executes within SEP 200 shown in FIG. 2.

This software is composed of two basic components: operating system (O/S) and related modules 305 and virtual office software 400.

Component 305 is formed of a basic O/S kernel 310, illustratively a conventional Linux O/S, with specific additional and conventional Linux modules to implement necessary network and web-based processing, and device operation. These modules include network address translation (NAT) module 320, IP routing module 330, Open SSL module 340, web server 350 (which is currently available under the name "Apache web server"), send mail module 360, TCP/IP processing module 370, PPP processing module 380 and device drivers 390. Software 300 includes, as its other component, virtual office software 400 that communicates, as symbolized by line 357, through Apache web server 350. Though a Linux O/S kernel is used, O/S 310 could just as easily be implemented using nearly any other PC or server-based operating system, such as a UNIX or MICROSOFT® WINDOWS® operating system—though, of course, the modules would need to be compatible with the chosen O/S.

NAT module 320 is conventional in nature and translates network, specifically IP, addresses as requested by O/S kernel 310. In particular, incoming messages from the WAN, depending on its port designation—which identifies a particular office application server and program on server 70 for which the message is intended, translates the address of that message from the IP address of the SEP to an IP address associated with that particular server. The port designation remains to define the particular server for that message. Similarly, though in a reverse direction, NAT 320 translates each outgoing message, based on its port address, from each one of the servers and destined to the remote client PC from the private IP address of the server to the public IP address of the SEP along with the corresponding port designation.

IP routing module 330 provides a routing table that provides IP routing information to O/S kernel 310. This routing table is established during initial configuration of the SEP from routing information provided from administrative web site 20 (see FIG. 1). It can, alternatively, be updated via conventional dynamic routing protocols such as RIP, OSPF, etc.

Open SSL module 340, as shown in FIG. 3A, provides conventional SSL processing—though in a Linux environment, including message encryption/decryption, using X.509 certificate 284. This certificate once downloaded during initial configuration of the SEP, is then accessed, as symbolized by line 343, by SSL process 340. The Apache web server uses the Open SSL module for secure traffic received over TCP port number 443.

Module 350 is a conventional web server, though again suited for use in a Linux environment, and provides a web-based portal through which virtual office software 400 communicates, over a WAN connection, with user browser 15 and receives user interaction data (mouse clicks and keystrokes therefrom) and provides screen shots thereto for local display on remote PC 10.

Sendmail module 360 (also known as "Qmail" for use with the Linux O/S) is conventional and is employed if SEP 200 is used without an external e-mail server, such as e-mail server 76 shown in FIG. 1. Module 360 implements message transmission through use of SMTP (simplified mail transport protocol).

TCP/IP processing module 370 and PPP processing module 380, shown in FIG. 3A, are conventional in nature and correspondingly implement a well-known TCP/IP stack (with packet assembly and disassembly) and provide point-to-point protocol (PPP) packet processing for use with packet transmission employing the PPP protocol over dial-up WAN link 59.

Display drivers module 390 comprises a set of conventional display drivers operating under control of O/S kernel 310 to control two Ethernet ports 220 and 250, V.90 fax/modem 230 and a local LCD display (not shown). Information is communicated between device drivers module 390 and Ethernet ports 220 (Port 1) and 250 (Port 2), and V.90

Fax Modem 230 as symbolized by lines 396, 394 and 398, respectively and, as symbolized by line 392, between display drivers module 390 and O/S kernel 310.

Communication between O/S kernel 310 and modules 320, 330, 340, 350, 360, 370, 380 and 390 is symbolized by lines 325, 335, 347, 353, 365, 375, 385 and 392, respectively. Inasmuch as modules 320, 330, 340, 350, 360, 370 and 380 are all conventional and readily available Linux components, none of them will not be discussed in any further detail.

Virtual office software 400, operative in conjunction with web server module 350, forms a core software component of our present inventive apparatus. In that regard, software 400 (which is discussed in detail below) implements real-time, bi-directional protocol translation, as described above, to enable the user situated at remote PC 10 to remotely control, execute and interact with any office application hosted at server 70 (see FIG. 1). In that regard, through appropriate protocol conversion, software 400, as shown in FIG. 3A, exchanges necessary information (data and user interactions) between, on the one hand, MICROSOFT®-RDP, IMAP4 or MICROSOFT® .NET SMB to communicate with office application servers 72, 76 or 78 (see FIG. 1), respectively; and, on the other hand, HTML and HTTP (or an intermediate transport protocol—AIP) as required by user browser 15 for non-thin-client applications, and AIP or a similar protocol for thin-client applications—all as required to support centralized hosting of office applications (e.g., user application hosting, file serving, and e-mail) but with user interaction and application display occurring remotely at the client computer under the browser. Modules 320, 330, 340, 360, 370 and 380, as shown in FIG. 3A, all provide necessary network packet processing, including address translation, encryption/decryption and send mail functionality, ancillary to software 400 but necessary to support proper packet communication over a WAN connection between it and both remote PC 10 and individual office applications executing on local server 70 (shown in FIG. 1).

Figure 3B:
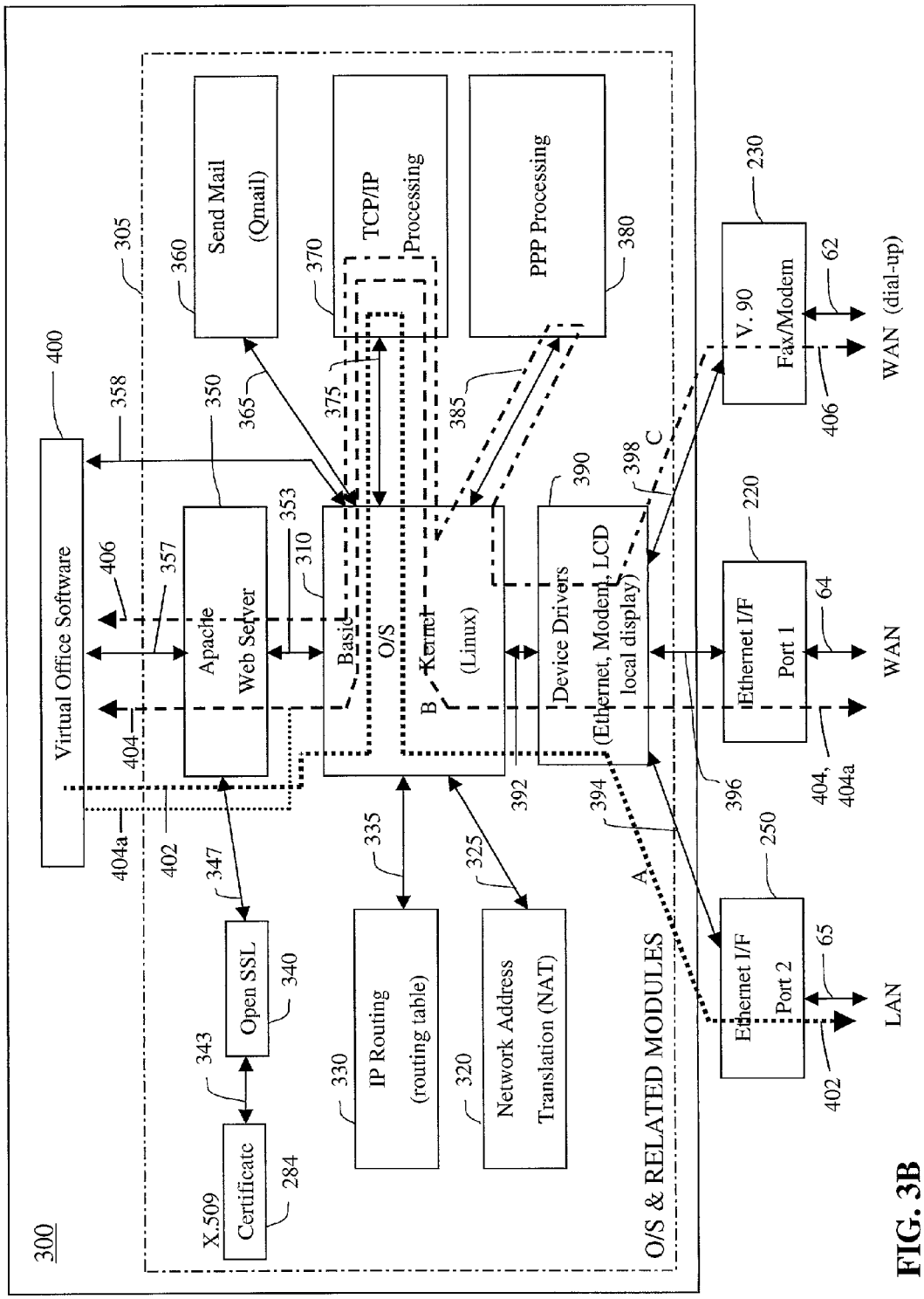
FIG. 3B depicts principal message paths through software 300 shown in FIG. 3A for passing communication between LAN and WAN connections and through SEP 200, as necessary, for implementing our present invention.

FIG. 3B depicts principal message paths through software 300 for passing communication between LAN and WAN connections and through SEP 200.

Given the location of the SEP intermediate between LAN 65 and WAN 30, three basic paths, i.e., paths 402, 404 and 406, exist, all three of which are under the control of O/S kernel 310. Note that paths 404 and 404a are common from the bottom of the figure to a point just below the Apache web server. From that point, path 404 continues through the Apache web server to the virtual office software, while path 404a bypasses the Apache web server and goes directly to the virtual office software.

First, incoming packets from the WAN connection, i.e., originating from remote PC 10 (see FIG. 1) and containing user interaction information relevant to non-thin-client functionality (e.g., user URI/URL selection, forms inputs, etc.) flows, as symbolized by dashed line 404 (also labeled as path "B" in FIG. 3B), through Ethernet port 220 (port 1), within the SEP through device drivers module 390, and via the O/S kernel, to TCP/IP processing module 370 for appropriate TCP/IP packet processing, including packet disassembly. From TCP/IP processing module 370, the resulting information in the disassembled packet is provided by O/S kernel 310, to web server 350, which calls on services of Open SSL module 340 to perform SSL processing on the packet, if necessary; for the Netilla Virtual Office, all information transfer is protected by SSL. After SSL processing, the HTTP request is extracted and sent to virtual office software 400 for protocol translation into a form suitable for use by a desired office application. Once virtual office software 400 has appropriately processed the information, by providing suitable protocol conversion, that information flows directly from software 400 to that office application accessible through the LAN if necessary (i.e., if it cannot be handled directly by the virtual office software). Information (such as the "network neighborhood" for the file sharing application) from the SEP destined to the remote user flows along path 404 but in an opposite direction to that just described so as to provide the opposite functionality.

Incoming packets from the WAN connection, i.e., originating from remote PC 10 (see FIG. 1) and containing user interaction information relevant to thin-client functionality (e.g., starting of a thin-client application, keystrokes and mouse clicks associated with a thin-client application, etc.) flows, as symbolized by dashed line 404a, through Ethernet port 220 (port 1), within the SEP through device drivers module 390, and via the O/S kernel, to TCP/IP processing module 370 for appropriate TCP/IP packet processing, including packet disassembly. From TCP/IP processing module 370, the resulting information in the disassembled packet is provided by O/S kernel 310, to virtual office software 400 via path 404a (paths 404 and 404a are identical except at the very end; path 404 goes to software 400 via the Apache web server while path 404a goes directly to the virtual office software). Once virtual office software 400 has appropriately processed the information by providing suitable protocol conversion (including performing SSL operations on the data), that information flows directly from software 400 to that office application accessible through the LAN via path 402, as described below, if necessary (i.e., if it cannot be handled by the virtual office software directly). Information (such as a thin-client screen update for a particular thin-client application, such as MICROSOFT® WORD™, a word processing application software, for example) from the SEP destined to the remote user flows along path 404a and then via path 404 but in an opposite direction to that just described so as to provide the opposite functionality.

Information incoming to the SEP from the LAN and which is ultimately destined to the remote user for non-thin-client applications (e-mail and file sharing) flows as shown by dotted path 402 (also labeled as path "A") within the SEP. This information is first received by Ethernet interface 250 (port 2), which is connected to the LAN, and from there transits through device drivers module 390, O/S kernel 310, TCP/IP processing module 370 (again for packet disassembly), then back through the O/S kernel to virtual office software 400. For non-thin-client data (i.e., data involved with file sharing or e-mail), software 400 generates an appropriate HTML page via an HTTP response containing this information and thereafter provides this page to web server 350. The web server calls on the services of Open SSL module 340 to provide appropriate security functions, and then transmits this page, via an HTTP response, to the remote client PC, specifically user browser 15 for display thereat. The data path from the virtual office software subsequently follows path 404 described previously. Information from the SEP, i.e., originating from the user, to the LAN flows in a reverse direction to that described in order again to provide the opposite functionality.

Information incoming to the SEP from the LAN and which is ultimately destined to the remote user for thin-client applications flows as shown by dotted path 402 within the SEP. This information is first received by Ethernet interface 250 (port 2), which is connected to the LAN, and from there transits through device drivers module 390, O/S kernel 310, TCP/IP processing module 370 (again for packet disassembly), then back through the O/S kernel to virtual office software 400. For thin-client data (i.e., data involved with application execution on servers on the LAN), virtual office software 400 performs data protocol conversion if necessary (for example, from RDP to AIP), along with the appropriate image conversions. Software 400 then generates appropriate AIP packets, on which it performs security operations as necessary, and then forwards those packets along path 404a to the remote client PC, specifically user browser 15 for display thereat. Information from the SEP, i.e., originating from the user, to the LAN flows in a reverse direction to that described in order again to provide the opposite functionality.

Note that in the traversals described above, the transference of data is traced through the O/S kernel as much as possible. However, since the O/S kernel is involved in essentially all operations that occurs in the SEP, FIG. 3B only shows those data flows particularly pertinent to the present invention, else showing every single interaction with the O/S kernel would result in overwhelmingly complex data flow diagram with essentially little gained from a perspective of understanding. Thus, for example, when the Apache web server hands off data to the virtual office software, the former must use some O/S kernel services to do so. However, this does not add to the understanding and unnecessarily complicates the diagram if one were to show this; therefore, FIG. 3B traces a direct path between the web server software and the virtual office software.

Lastly, information incoming to the SEP through the dial-up connection, such as from administrative web site 20, flows as shown by dot-dashed path 406 (also labeled as path "C"). This information is first received by V.90 fax modem 230, such as from the administrative web site via the WAN, and from there transits through device drivers module 390, O/S kernel 310 and PPP processing module 380. Once module 380 has provided requisite PPP processing, O/S kernel 310 routes the resulting processed message to TCP/IP processing module 370 (again for packet disassembly), then back through the O/S kernel to virtual office software 400, via web server 350, for protocol translation into a form suitable for use by a desired office management process or application, and for subsequent routing to the appropriate office application server, if necessary. Outgoing information from the SEP, i.e., originating from an office management process or application server and destined to, e.g., the administrative web site but carried through the dial-up WAN connection flows in a reverse direction to that described in order to provide the opposite functionality. Specifically, for such outgoing information, software 400 first receives the information from the office management process or application server and then applies this information to web server 350 which, in turn, imparts HTTP processing of this message. The message then transits, via the O/S kernel, to TCP/IP processing module 370 and PPP processing module 380 prior to be routed, via device drivers 390, to the V.90 fax modem for transmission, via dial-up WAN connection 62, to the user browser. Note that sessions originating from the SEP, such as sessions to the administrative web site from the management process in the SEP, would follow essentially the same outgoing and incoming paths, except that they would not go through the Apache web server.

Figure 4:
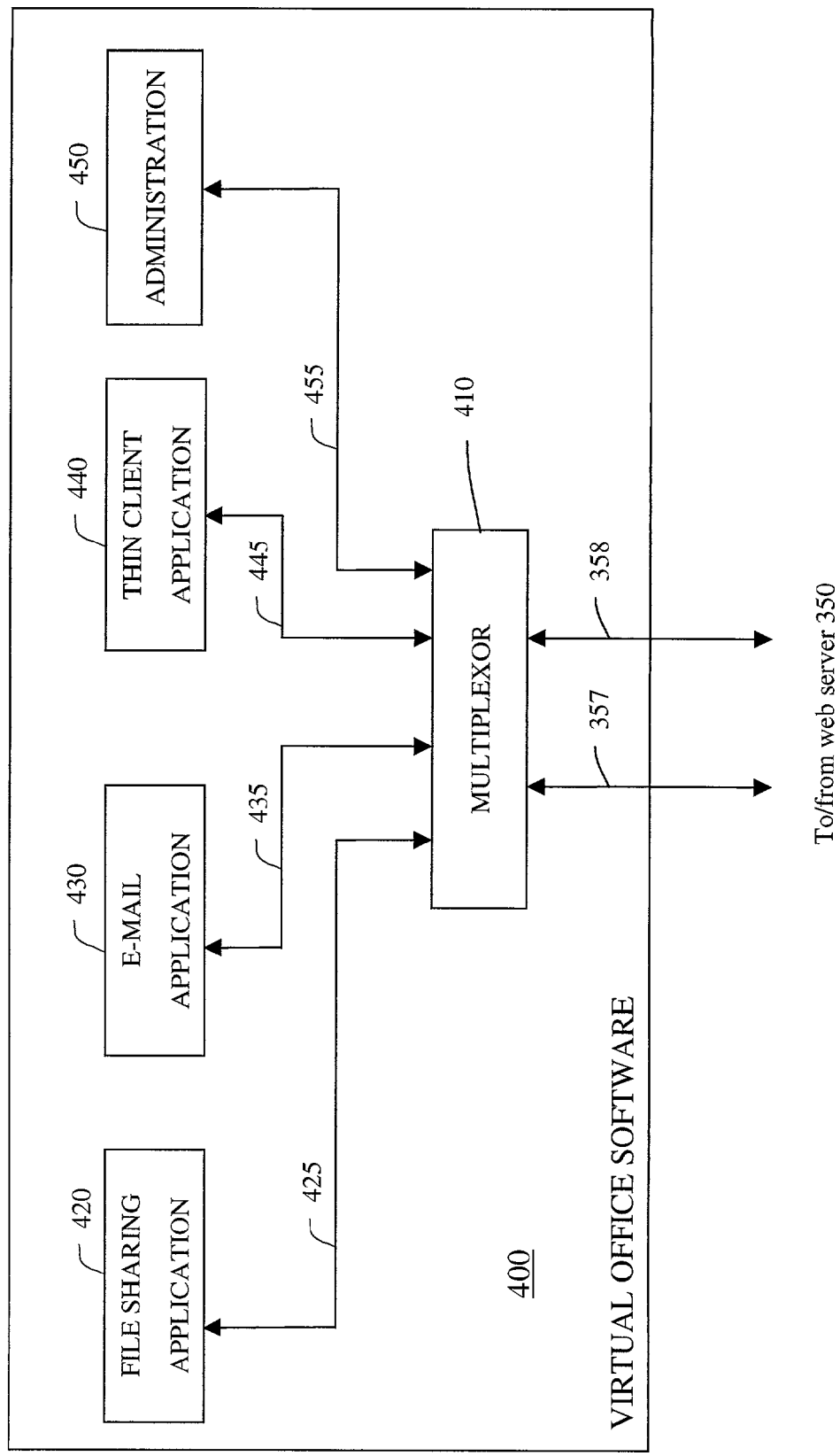
FIG. 4 depicts a high-level block diagram of virtual office server software 400, executing within the SEP 200 shown in FIG. 2, for implementing our present invention.

FIG. 4 depicts a high-level block diagram of virtual office server software 400.

As shown, software 400 contains four office application modules: file sharing application module 420, e-mail application module 430, thin-client application module 440 and administration module 450; along with multiplexor 410.

In general, each of the modules accepts as input, in one direction, user interaction data, in the form of user URI/URL inputs and form data provided via HTTP/secure HTTP or in the form of keystrokes, mouse clicks, etc. encoded via a transport protocol, such as AIP, (optionally secured by SSL) for the thin-client support and generates a message, in an appropriate application protocol, containing this data to a corresponding office application. Each such module also operates in the reverse direction by accepting output information, such as a screen shot or data list, produced by its corresponding office application and converting that information, from its application protocol, into a graphical HTML page in a secure HTTP response or into a transport protocol, such as AIP, secured by SSL for thin-client support for transmission to and rendering, as a web page, by the user browser. Thus, each of these modules acts both as a bridge between the user and a specific one of his(her) office applications and as a protocol translator to enable bi-directional, secure, web-based, real-time communication to occur between user browser 15 and that particular office application.

File-sharing application module 420 (described in detail below in conjunction with FIGS. 5–7) interacts with a client file handler (specifically a Linux "SAMBA" module which is an open source software component that implements a NET-BIOS Windows Networking client on a Linux O/S to interact with Windows based file servers) in order to provide user file information, such as listings of desired directories, and permit the user to copy, move and delete files, as desired.

E-mail application module 430 (described in detail below in conjunction with FIGS. 8–10) interacts with a client e-mail handler (specifically an IMAP client) to access and retrieve user e-mail stored on an e-mail server, such as a MICROSOFT® EXCHANGE™ server, as well as to manipulate stored e-mail residing in user's e-mail folders (Inbox, Outbox, Sent Mail and the like) on that server. In terms of message reception, module 430 provides a list of received messages, typically with address and truncated content information—as typically occurs in e-mail clients (such as in MICROSOFT® OUTLOOK™ e-mail client program; "MICROSOFT® OUTLOOK™" is a trademark of the Microsoft Corporation of Redmond, Wash.) and, once displayed, permits the user to select, and separately and fully display each message, as desired. This module also permits the user to send outgoing e-mail to and through that server.

Thin-client application module 440 (described in detail below in conjunction with FIGS. 11–13) interacts, through the remote desktop protocol (RDP), with a client application program (e.g., MICROSOFT® WORD™, a word processing application software, MICROSOFT® EXCEL™, a spreadsheet software application, or other application program; "MICROSOFT® WORD™" and "MICROSOFT® EXCEL™" are trademarks of the Microsoft Corporation of Redmond, Wash.) being hosted on server 70. Module 440 receives user mouse clicks and keystrokes from the user browser, in AIP form, and passes that information, via RDP, to the client application program to control its execution. In return, this module obtains graphical output displays, as screen shots, generated by the client application program and in RDP form, and converts those screen shots into AIP form and then transmits AIP messages, containing the screen shots, back to the user, specifically the user browser for rendering thereat.

Administration module 450 maintains lists of user names and passwords and other information necessary to permit controlled, secure, remote access to the virtual office functionality as well as to properly monitor its ongoing operation. This module interacts through web server 350 and contains a conventional internal database and associated processes (all of which are not shown but well known) to maintain lists (including establishing initial lists and updating them as needed) of authorized user names and passwords, and, based on login information supplied by a user then seeking remote access, determine whether that user is to be permitted to access virtual office functionality and, if so, to enable such access. This module also alerts administrative web site 20 (see FIG. 1) if, as a result of its monitoring tasks, it detects any abnormal operation for any of the virtual office functionality. Since this module is not particularly relevant to the present invention, we will not discuss it in any further detail.

Multiplexor 410 passes each outgoing message from each of the modules destined to the user to web server 350 or directly to TCP/IP module 370 for the thin-client processing, as well as each incoming message from the user, as received by the web server or directly from the TCP/IP module, to an associated one of the application modules. Communication between each of applications 420, 430, 440 and 450, and multiplexor 410 is symbolized by lines 425, 435, 445 and 455, respectively; while communication between the multiplexor and the web server is symbolized by line 357 and communication between the multiplexor and the TCP/IP module (via the O/S kernel) is symbolized by line 358.

Figure 5:
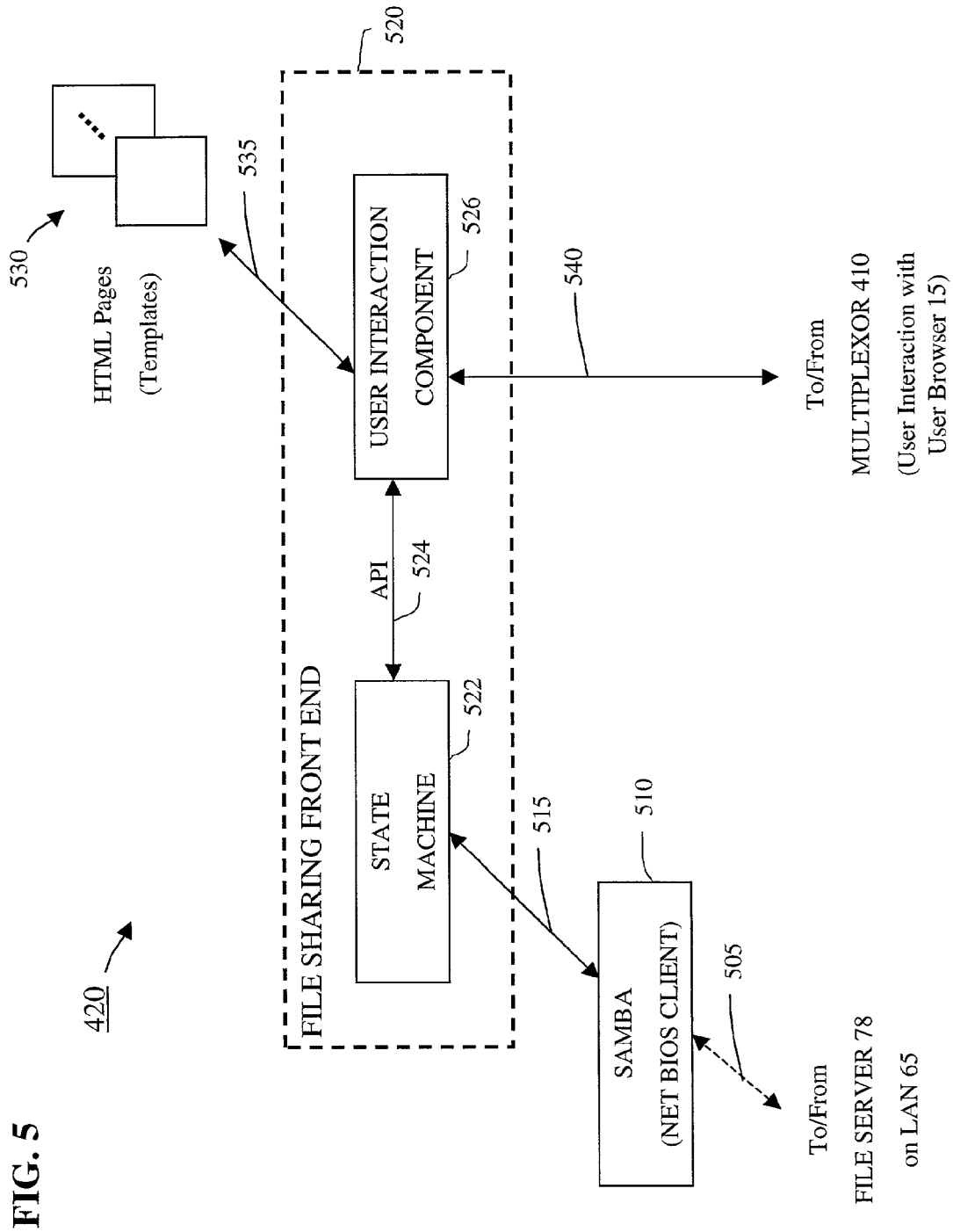
FIG. 5 depicts a block diagram of file sharing application module 420 that forms a part of software 400 shown in FIG. 4.

FIG. 5 depicts a block diagram of file sharing application module 420 that forms a part of software 400 shown in FIG. 4. As noted above, this module interacts with a client file handler (file server) to provide the remote user with his(her) file information, such as listings of desired directories, and permit that user to copy, move and/or delete files to which that user has appropriate access.

Module 420 contains SAMBA component 510, file sharing front end component 520 and HTML pages 530.

SAMBA component 510 is a conventional open source LINUX component that implements a NET-BIOS Windows Networking client for interacting with a Windows remote file server, here file server 78 on LAN 65. File sharing front end 520 is itself formed of state machine 522 and user interaction component 526 which communicate with each other through an application programming interface (API) as symbolized by line 524.

User interaction component 526 obtains, as symbolized by line 540, user interaction data, i.e., URL/URI selection and form input, incoming from multiplexor 15 and contained in secure HTTP requests provided by user browser 15, representative of a user request to file server 78. Component 526 extracts the information from these web pages. This request can take the form of, e.g., the user clicking, through his(her) user browser, on a displayed icon in order to obtain a network environment ("network neighborhood") listing for the LAN or a directory or sub-directory listing for a particular computer then connected to the LAN. Once component 526 obtains sufficient user interaction data to issue the request to the file server, this component then translates this interaction data into a corresponding request to state machine 522. The state machine, in turn, interprets this request into a sequence of specific commands, by issuing one command at a time based, where appropriate, on a immediately prior response from the file server. In that regard, state machine 522 applies, as symbolized by line 515, a command to SAMBA component 510 which directly interacts, over the LAN and as symbolized by dashed line 505, with file server 78. File server 78 provides its response to that command back to SAMBA component 510 which, in turn, provides that response to state machine 522. Based on each response it receives, via SAMBA component 510 and via line 515, from file server 78, state machine 522 will react accordingly and could issue another command, via the SAMBA component, to the file server for additional data which the state machine then needs to fulfill the user request or, if all such data has then been received, construct a suitable response containing that data (if any) and provide it, via API 524, to user interaction component 526. Once the data has been provided to component 526, that component will retrieve, based on the nature of the user request and as symbolized by line 535, a corresponding stored HTML template page from stored pages 530 and populate that template page with the data returned in the list. Component 526 then returns, here symbolized by line 540, a resulting populated HTML page, via multiplexor 410, to web server 350 for transmission, via HTTP, to user browser 15 for rendering thereat.

Figure 16:
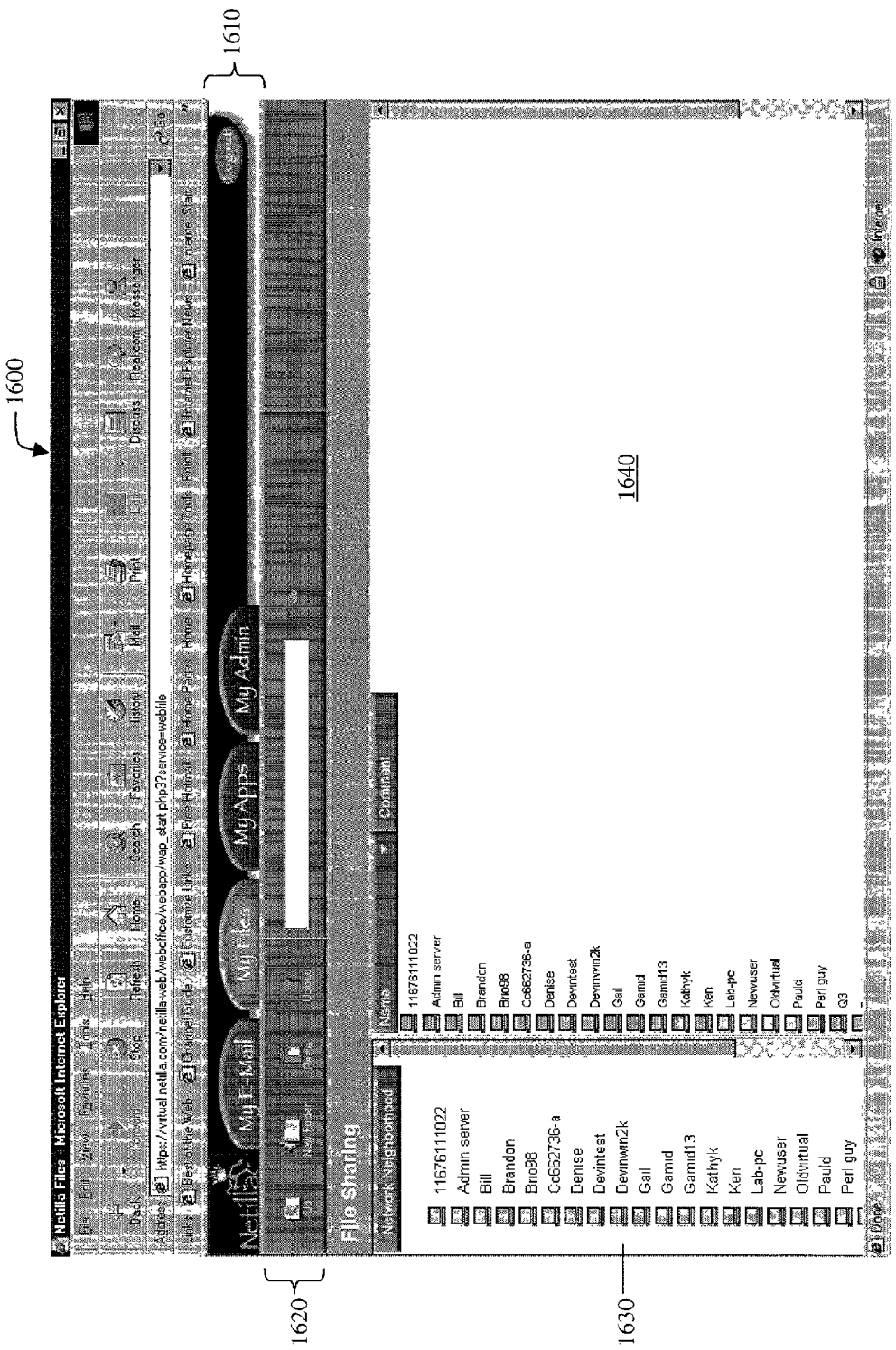
FIG. 16 depicts actual screen shot 1600 of a typical display screen rendered at user browser 15, shown in FIG. 1, for permitting a remote user, through the file sharing capability of the present invention, can remotely access and manipulate his(her) files residing on file server 78.

FIG. 16 depicts actual screen shot 1600 of a typical graphical display produced, at user browser 15, by component 420 for depicting and manipulated shared user files. This capability is invoked by the user having clicked on the "My Files" tab in display area 1610. Visual feedback of that selection is illustratively provided through a highlighted background for this tab.

As depicted in screen shot 1600, a network neighborhood, showing various computers then available on the LAN, appears in graphical form as a vertical list in left panel 1630 with each computer being represented by an icon and its machine name. Should a user click on any icon in the left panel, user interaction component 526 will generate, based on information it receives from state machine 522 and originating from file server 78, a hierarchical display under that icon, in effect expanding that hierarchy one level, to show a next lower level in the hierarchy, and so on. Hence, all the directories for the machine represented by the icon will be displayed directly under that icon and appropriately indented and graphically linked to show their hierarchical relationship. The contents at that lower level of the hierarchy or any user selected item at that level will be displayed in right panel 1640. The user can then click on any directory at that hierarchical level, on either the left or right panels, to gain a listing of the next lower hierarchical level, and so forth, with the further expanded hierarchy shown in left panel 1630 and the contents of any selected item at that lower level in that hierarchy shown in right panel 1640. At a lowest level of the hierarchy, panel 1630 will depict the sub-directories at that level with panel 1640 depicting the files for a selected sub-directory thereat. By successively clicking on an icon in the hierarchy, the user can drill down the hierarchy to examine a particular sub-directory of interest on a desired networked machine available on LAN 65. The illustrative display in screen shot 1600 specifically depicts a high level of the hierarchy prior to the user selecting any of the network-connected computers for further examination. Further, by clicking on an "Up", "New Folder", "Paste" or "Upload" button in display area 1620, the file sharing application module will display a next higher level of the hierarchy, create a new folder (or file), paste a folder into a desired location in the hierarchy or upload a selected folder residing on the remote client PC to a desired location at the file server, respectively. Note that popup menus are provided, at particular levels of the hierarchy, to allow for features such as the copying, deleting, etc. of files and directories at each such level.

Figure 6:
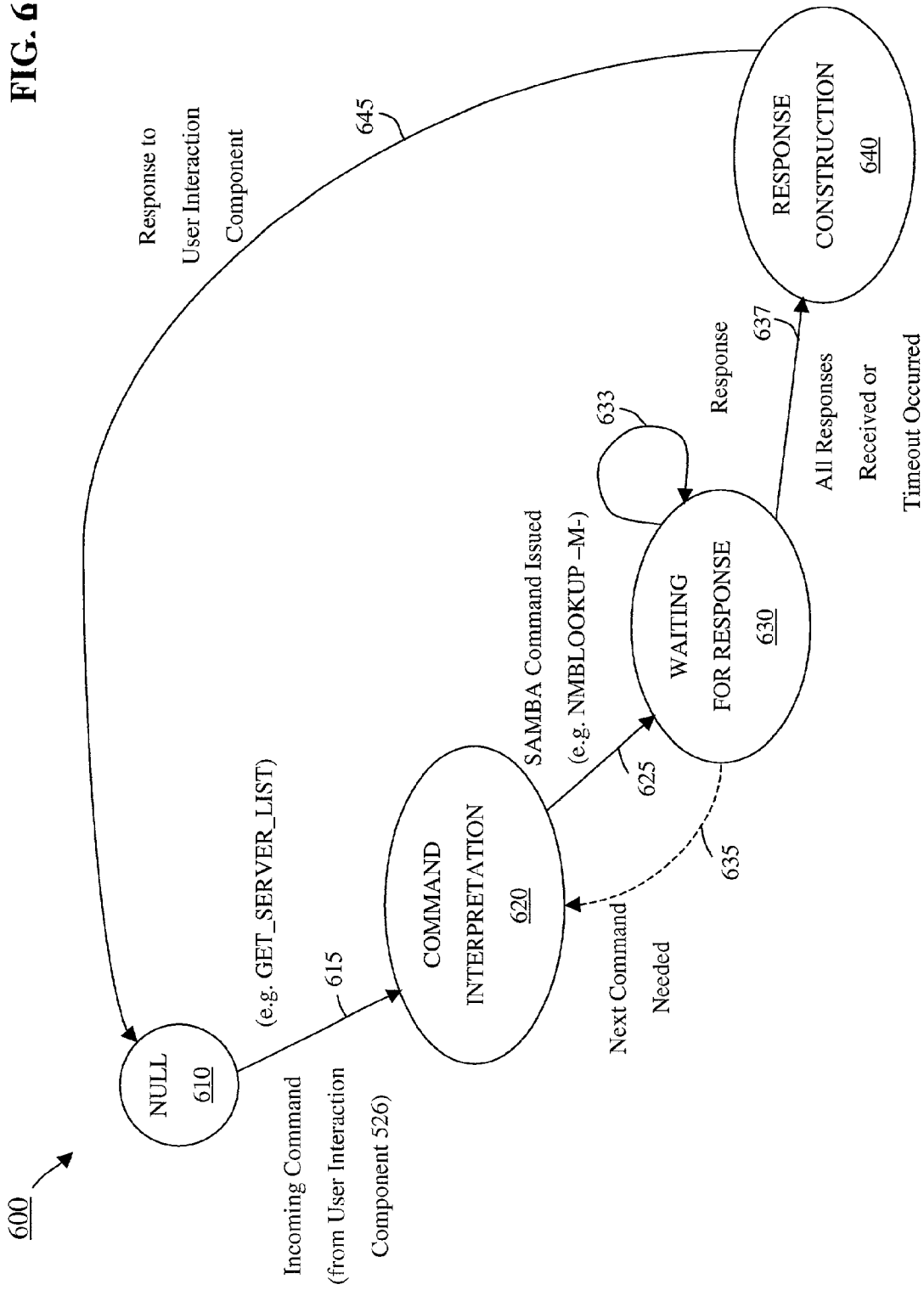
FIG. 6 depicts state diagram 600 for state machine 522 shown in FIG. 5.
Figure 7:
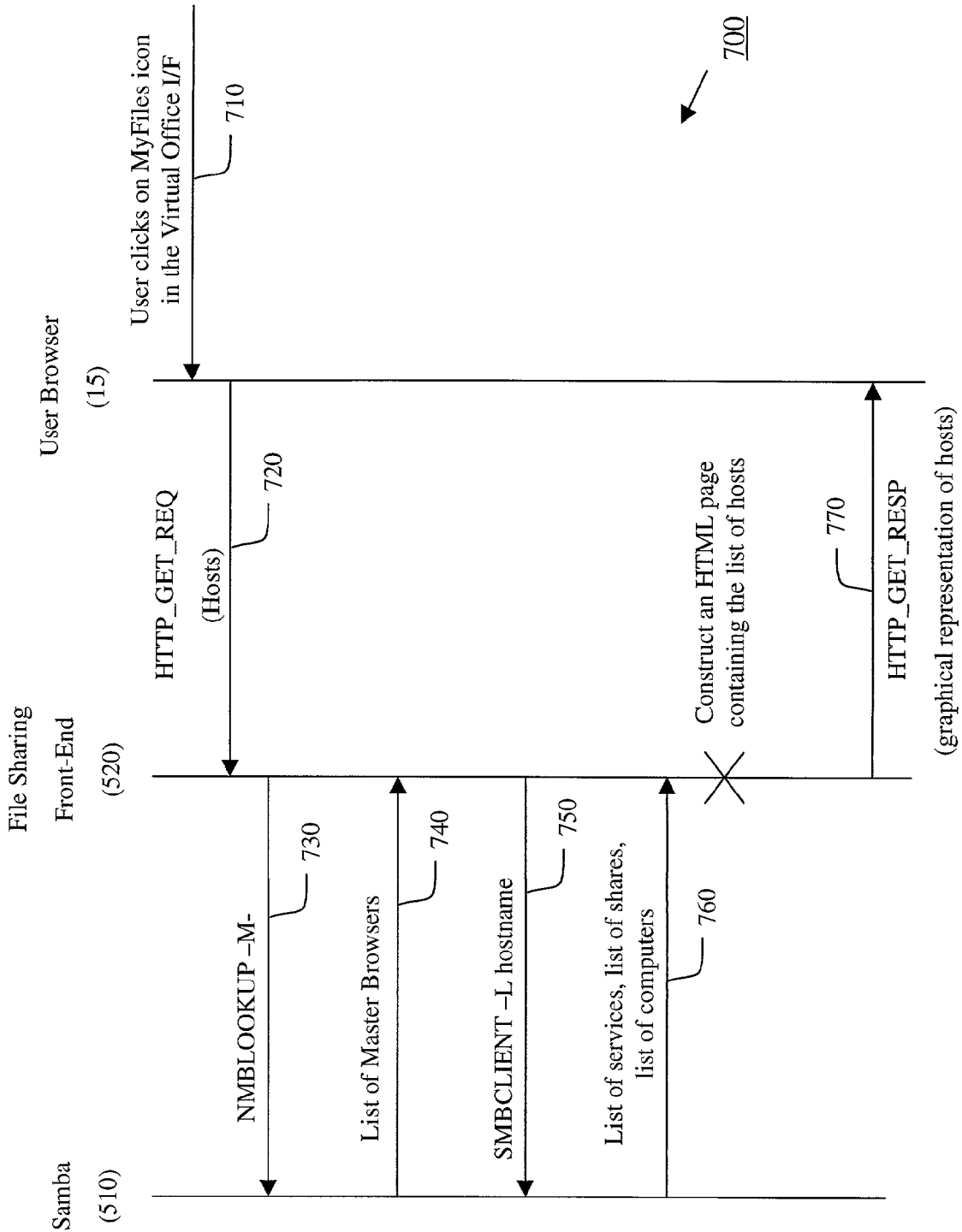
FIG. 7 depicts illustrative inter-process communication 700 that involves file sharing application module 420, operative in conjunction with file server 78 (shown in FIG. 1), for obtaining and remotely displaying files for a given user.

To gain improved understanding of the operation of file sharing application module 420, the reader should now simultaneously refer to FIGS. 6 and 7.

FIG. 6 depicts state diagram 600 for file sharing front-end state machine 522. FIG. 7 depicts illustrative inter-process communication 700 that involves file sharing application module 420, operative in conjunction with the file server 78, for obtaining and remotely displaying files for a given user.

As shown, state machine 522 contains four distinct states: null state 610, command interpretation state 620, waiting for response state 630 and response construction state 640.

Initially, state machine 522 resides in null state 610. One a user clicks on the "My File" icon in the Netilla virtual office graphical interface (e.g., displays 1600, 1700 or 1800 shown in FIGS. 16, 17 or 18, respectively), this operation being symbolized by line 710, user browser 15 issues, symbolized by line 720, an appropriate HTTP request instruction ("HTTP_GET_REQ (/hosts)") to fetch a name of every host then on the LAN. File sharing front end 520, specifically user interaction component 526 (see FIG. 5), receives this command, and in response thereto, issues a command to the state machine, such as "GET_SERVER_LIST", to identify all the file servers on LAN 65. State machine 522 then transitions as symbolized by path 615 (in FIG. 6), to command interpretation state 620. While in this state, state machine 522 interprets the "GET_SERVER_LIST" command to yield a sequence of commands to SAMBA component 510 to query component 510 for the desired information. In particular, for the "GET_SERVER_LIST" command, command interpretation state 620 will first issue, as symbolized by line 730, a "NMBLOOKUP -M-" command to SAMBA component 510 to query file server 78 for a list of master browsers then operating on the LAN. A master browser identifies a computer that contains a list of names of all the computers then accessible on the LAN for a particular domain. The SAMBA component will, in turn, send appropriate commands to file servers 78 to satisfy this query. Once this command is issued, state machine 522 will then transition, as symbolized by line 625, to state 630 wherein the state machine will simply wait, as represented by line 633, for a response from the file servers as provided by SAMBA component 510. Eventually, the file server responds to the SAMBA query through which, as a result, SAMBA component 510 provides, as symbolized by line 740, a list of the master browsers for each domain on the LAN to state machine 522 within file sharing front-end component 520. In response, state 630 will determine if the state machine has received all the responses from the file server needed to satisfy the user request or whether additional information is necessary. If the latter occurs, then state 630 will transition, as symbolized by line 635, back to command interpretation state 620 for the latter state to issue the next SAMBA command in sequence, and so forth. In the present example, once the list of master browsers is returned, command interpretation state 620 issues, as symbolized by line 750, an "SMBCLIENT -L hostname" command where "hostname" is the name of the master browser for a particular domain on the LAN. In response to this latest command, again state machine 522 transitions, as symbolized by line 625, to state 630 at which the state machine remains (as symbolized by line 633) until it receives an appropriate response from the file server via the SAMBA command. In response to this command, the file server returns a list of services, a list of shares and a list of computers associated with the corresponding domain, which the SAMBA component in turn, passes, as symbolized by line 760, back to file sharing front end 520 and specifically to state machine 522 therein. At this point, all the needed information has been received for this particular user request. Hence, state machine 522 transitions, as symbolized by line 637, to response construction state 640. Through this state, state machine 522 constructs a linked list that contains all the information supplied by the file server in response to the "GET-SERVER-LIST" message (which was originally sent as a result of the receipt of the "HTTP_GET_REQ (/hosts) message" and provides that list back to user interaction component 526. Once this occurs, state machine 526 returns, as symbolized by line 645, back to null state 610. Once the user interaction component receives the linked list, it accesses an appropriate HTML template web page and populates that page with the information provided in the response. After the page is fully constructed, the user interaction component sends, as symbolized by line 770, that page back through multiplexor 410 to web server 350, via an "HTTP_GET_RESP" message, for transmission to user browser 15 to depict a graphical rendering of the hosts specified by the file server, e.g., a page of the form shown by screen shot 1600 for the typical display shown in FIG. 16. Response construction state 640, shown in FIG. 6, is also entered from state 630 if excess time, i.e., a timeout condition, has occurred once a command has been issued to the SAMBA component without any corresponding response therefrom (which could be as a result of a problem with the SAMBA component, with the LAN itself, or with server(s) on the LAN. As such, state 640 will specify this timeout condition to the user interaction component which, in turn, will construct and then transmit a web page to user browser 15 notifying the user of an timeout/error condition.

Not only can the user display files through interaction with user browser 15, but also, depending upon current permissions which this user then has, (s)he can move or copy selected files from one directory (sub-directory) to another, or delete such files. File sharing module 420, including state machine 522, operates in a very similar manner as that described above, with identical states though different commands, to execute file copy, move and delete operations through file server 78 in response to corresponding remote user interactions through user browser 15.

Figure 8:
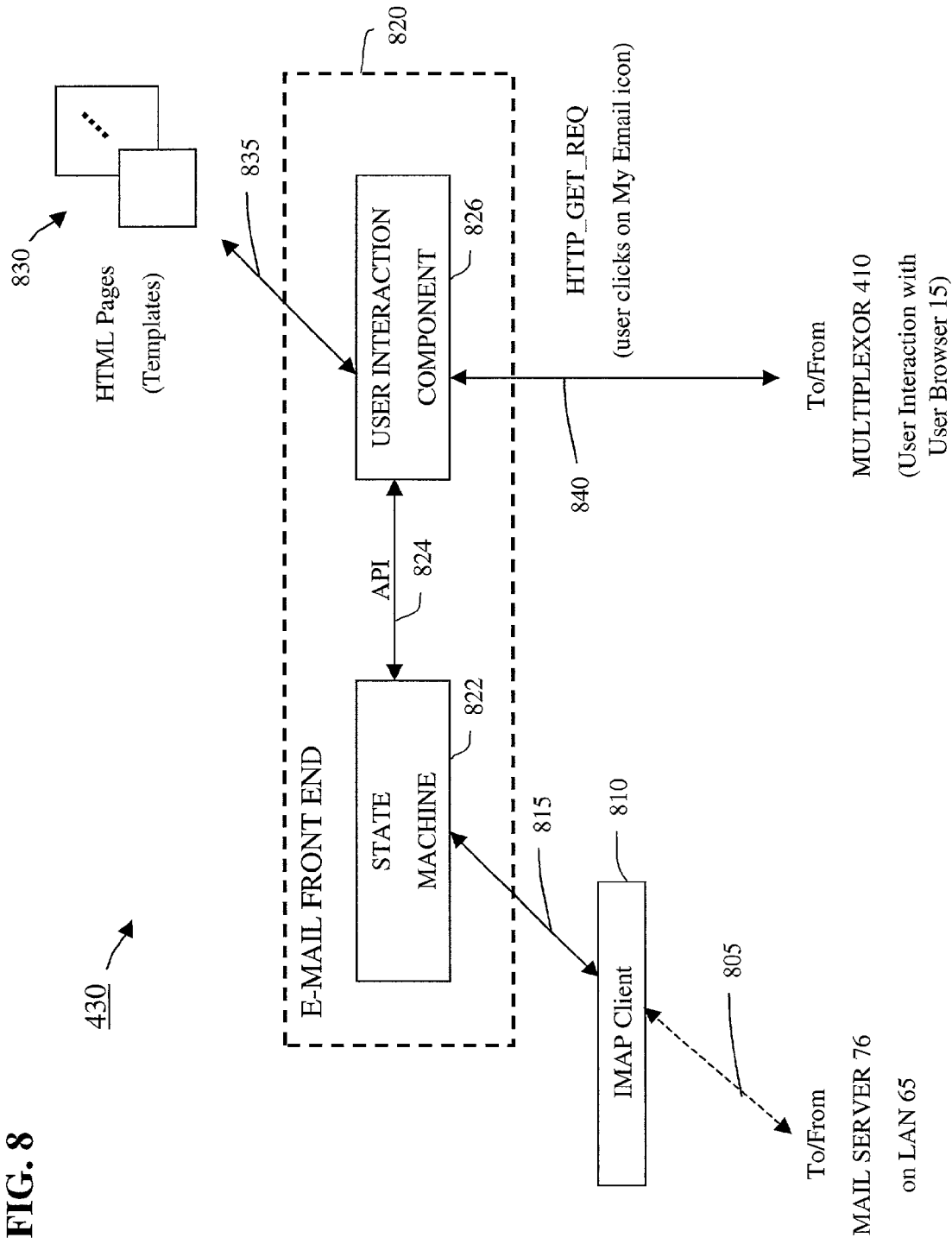
FIG. 8 depicts a block diagram of e-mail application module 430 that forms a part of software 400 shown in FIG. 4.

FIG. 8 depicts a block diagram of e-mail application module 430 that forms a part of virtual office software 400 shown in FIG. 4. As noted above, module 430 interacts with a client e-mail IMAP handler to access and retrieve user e-mail stored on an e-mail server as well as to manipulate stored e-mail residing in his(her) e-mail folders (Inbox, Outbox, Sent Mail and the like) residing on that server.

Module 430 contains IMAP (Internet Message Access Protocol) client component 810, e-mail front end component 820 and HTML pages 830. As can be appreciated, module 430 has a very similar architecture to file sharing application module 420 shown in FIG. 5, as well as to thin-client application module 440 shown in FIG. 11 (and discussed in detail below).

IMAP client component 810 is a conventional e-mail client component that provides rich interaction with a mail server, such as MICROSOFT® EXCHANGE™ server, that supports the IMAP4 protocol. For example, the IMAP client downloads and displays stored e-mail messages, residing on the mail server, from an Inbox associated with a user. The IMAP client then permits the user to move and copy mail messages from one folder at the server associated with that user (e.g., Inbox) to another such folder (e.g., Sent), as well as delete any such messages from any such folder. E-mail front end 820 is itself formed of state machine 822 and user interaction component 826 which communicate with each other through an application programming interface (API) as symbolized by line 824.

User interaction component 826 (in a similar manner as does user interaction component 526 described above) obtains, as symbolized by line 840, user interaction data, i.e., form input data and URI/URL selections, incoming from multiplexor 15 and contained in HTTP requests provided by user browser 15, representative of a user request to e-mail server 76. Component 826 extracts the information from these requests. This request can take the form of, e.g., the user clicking, through user browser 15, on the "My E-mail" tab to access and list the user's e-mail then residing in his(her) Inbox on the e-mail server. Such an interaction results in the user browser issuing an "HTTP_GET_REQ (/Inbox)" message (request) to obtain an HTML page in response (via an HTTP Response) that contains the desired list. Further, once this page and its list are returned and graphically rendered by the user browser, subsequent user interaction can take the form of the user clicking on an icon associated with a different folder of e-mail messages to obtain a list of the messages, in abbreviated form, in that folder; as well as the user clicking on any such entry in any such list then being displayed to expand that rendered version of the message. Similarly, the user, through appropriate mouse manipulation, can drag and drop, hence rearranging, e-mail messages from one of his(her) folders to another.

Once component 826 obtains sufficient user interaction data from the user—which in the simple case of the user clicking on the "My E-mail" tab is the HTTP request message, via web server 350 (see FIG. 3A) and multiplexor 410, to issue a request to the e-mail server, this component then translates this interaction data into a corresponding request to state machine 822, shown in FIG. 8. The state machine, in turn, interprets this request into a sequence of specific commands, by issuing one command at a time based, where appropriate, on a immediately prior response from the e-mail server. In that regard, state machine 822 applies, as symbolized by line 815, a command to IMAP client component 810 which directly interacts, as symbolized by dashed line 805 and over LAN 65, with e-mail server 76. E-mail server 76 provides its response to that command back to IMAP client component 810 which, in turn, provides, via line 815, that response to state machine 822. Based on each response it receives, via IMAP client component 810, from e-mail server 76, state machine 822 will react accordingly and issue another command, via the IMAP client component, to the e-mail server for additional data which the state machine then needs to fulfill the user request or, if all such data has then been received, construct a suitable response containing that data and provide it, via API 824, in the form of a linked list to user interaction component 826. Once the linked list has been provided to component 826, that component will retrieve, based on the nature of the user request and as symbolized by line 835, a corresponding stored HTML template page from stored pages 830 and populate that template page with the data returned in the list. Component 826 then returns, here symbolized by line 840, a resulting populated HTML page, via multiplexor 410, to web server 350 for transmission, via HTTP, to user browser 15 for rendering thereat.

Figure 17:
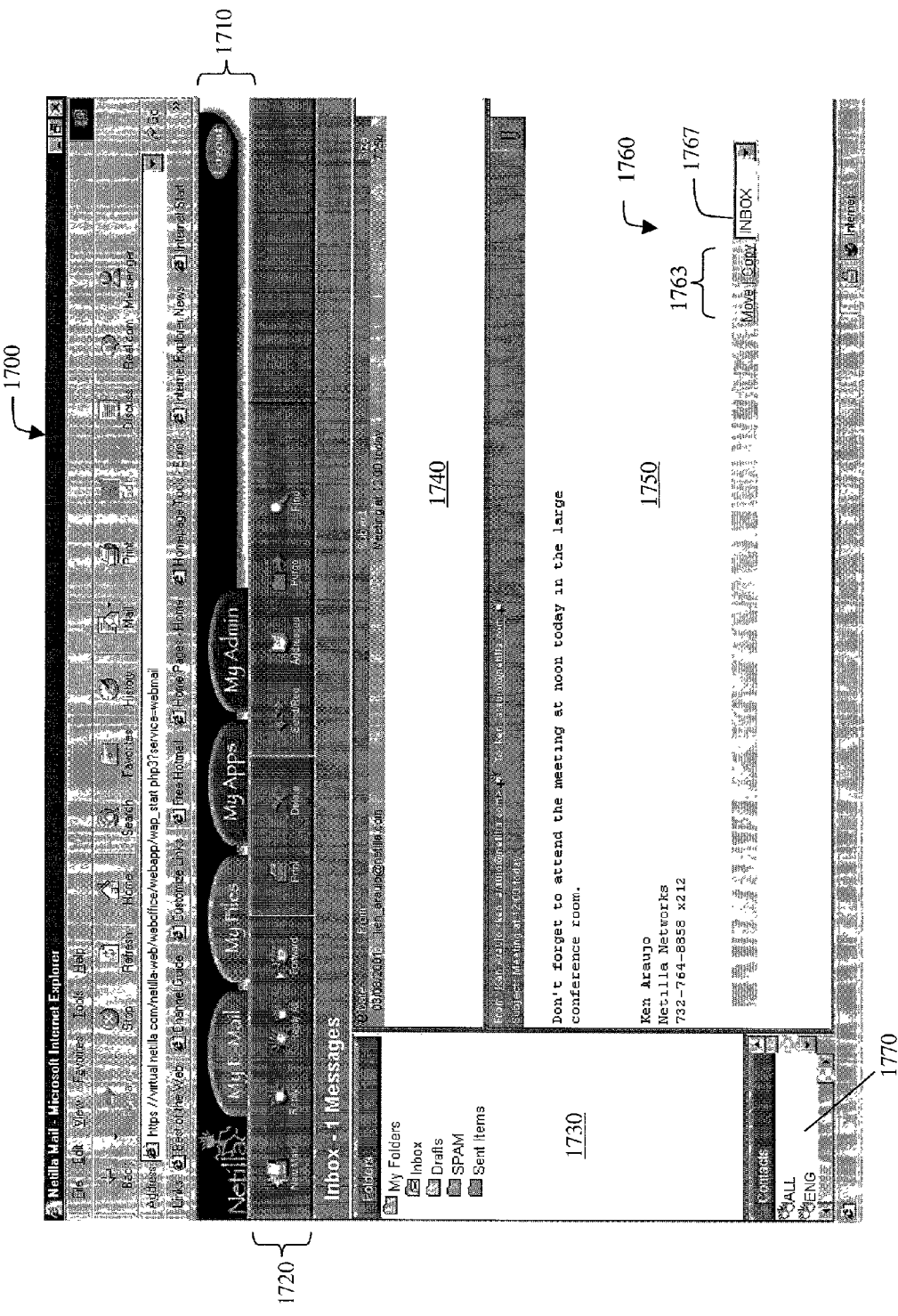
FIG. 17 depicts actual screen shot 1700 of a typical display screen rendered at user browser 15, shown in FIG. 1, through which a remote user, through the e-mail capability of the present invention, can remotely access his(her) e-mail stored on e-mail server 76 as well as send outgoing e-mail to that server.

FIG. 17 depicts screen shot 1700 of a typical graphical display produced, at user browser 15, by component 420 for depicting e-mail messages. This capability is invoked by the user having clicked on the "My E-mail" tab in display area 1710. Visual feedback of that selection is again illustratively provided through a highlighted background for this tab.

As depicted in display 1700, a vertical list of the e-mail folders available for that user is graphically provided in left display panel 1730. These folders include "Inbox", "Drafts", "Sent Items" as well as other folders, such as "Spam", including those which the user has specifically defined. When this capability is first invoked, a listing of the user's e-mail in his(her) Inbox folder is displayed in abbreviated form in mail list (upper right) display area 1740 as entries in a vertical table with contents of a most recent entry in that folder being displayed in mail content (lower right) display area 1750. Here, that table contains only one illustrative entry with its specific contents being displayed. Should the mail list contain multiple entries, the user can click on any such entry. In response, user interaction component 826 will display the contents of the message, associated with that entry, in display area 1750. The specific folder then being displayed is graphically indicated through an change (here being a small overlaid envelope symbol) in its displayed icon (as shown for the Inbox icon). Similarly, if the user clicks on an icon for a different folder, then display area 1740 will list the contents of that folder from which the user can select, again by clicking, a desired entry to reveal its contents in display area 1750. In addition, through tool 1760, specifically selection of either a "Move" or "Copy" link within links 1763 and selection of a desired folder through pull-down menu 1767, the user can move or copy the presently displayed e-mail message to the selected folder. Contacts display area 1770 provides various folders which contain contact information, e.g., names, addresses—both postal and e-mail, telephone and facsimile numbers, and other information stored and organized by that user in various folders. Further, when the user clicks on a "New Mail", "Reply", "Reply All" or "Forward" button in display area 1720, the e-mail application module will correspondingly invoke associated functionality to compose a new e-mail message; compose a reply message to the sender of a message then being displayed in area 1750 or to the sender and all recipients of that message, or forward the message then being displayed in area 1750 to a desired recipient, such as those in any of the contacts folders. By clicking on a "Print" or "Delete" button in area 1720, the e-mail application module will invoke associated functionality to print the e-mail message then selected in area 1740 or displayed in area 1750, or to delete that message, respectively. Lastly, when the user clicks on the "Send/Rec", "Addresses", "Purge" or Find" buttons, the e-mail application module will correspondingly invoke functionality to toggle its mode from receiving to sending e-mail, list addresses through a conventional address book capability, purge a mail folder then being displayed of its entries, and finally undertake a search through an e-mail folder then being displayed for a desired message.

Figure 9:
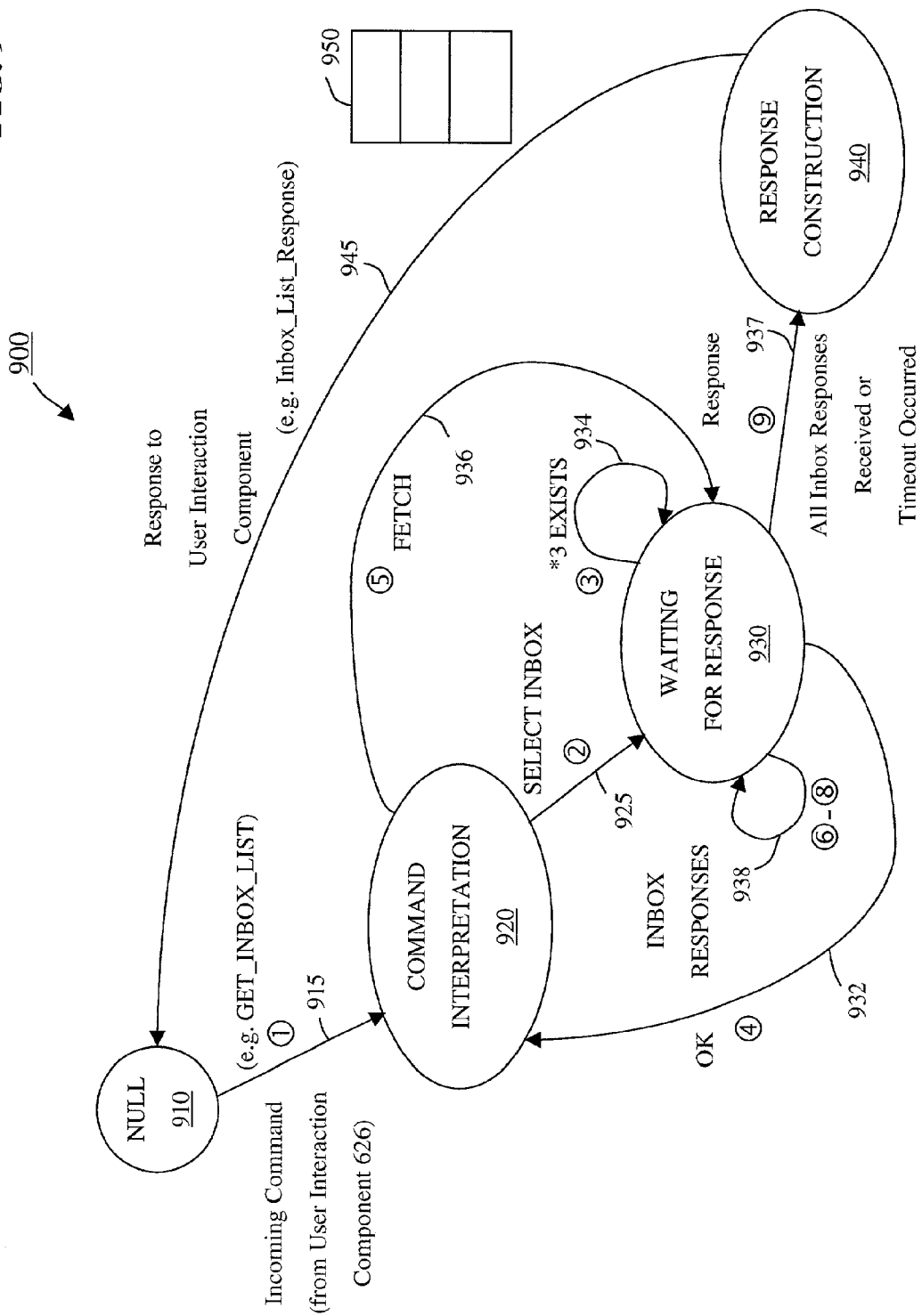
FIG. 9 depicts state diagram 900 for state machine 822 shown in FIG. 8.
Figure 10:
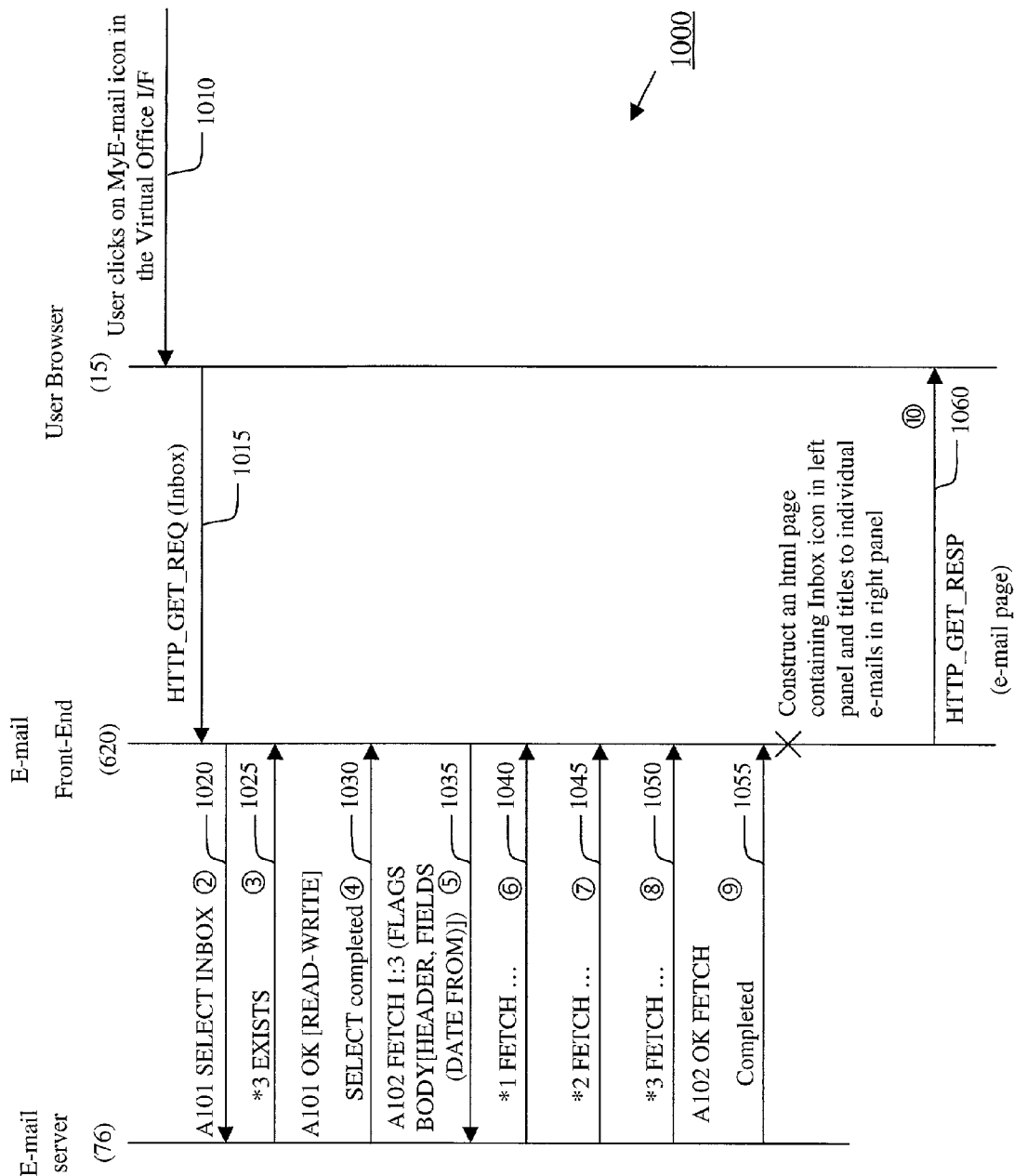
FIG. 10 depicts illustrative inter-process communication that involves e-mail application module 430, operative in conjunction with e-mail server 76 (shown in FIG. 1), for retrieving and remotely displaying a list of incoming e-mail messages for a given user.

To gain improved understanding of the operation of e-mail application module 430, the reader should now simultaneously refer to FIGS. 9 and 10.

FIG. 9 depicts state diagram 900 for e-mail front-end state machine 822. FIG. 10 depicts illustrative inter-process communication 1000 that involves e-mail module 430, operative in conjunction with the e-mail server 76, for retrieving user e-mail messages residing on that server.

As shown, state machine 822 contains four distinct states (similar to those in state diagram 600 shown in FIG. 6 for state machine 522 in file sharing application module 420): null state 910, command interpretation state 920, waiting for response state 930 and response construction state 940.

Initially, state machine 822 resides in null state 910. Once a user clicks on the "My E-Mail" icon in the Netilla virtual office graphical interface (e.g., displays 1600, 1700 or 1800 shown in FIGS. 16, 17 and 18, respectively), this operation being symbolized by line 1010, user browser 15 issues, as symbolized by line 1015, an appropriate HTTP request instruction ("HTTP_GET_REQ (/Inbox)") to fetch the contents of the user's Inbox. The e-mail application module, now acting through the IMAP client, interacts with the e-mail server, via the IMAP protocol, to retrieve a message list for the user's Inbox.

In doing so, e-mail front end 820, specifically user interaction component 826 (see FIG. 8) receives this HTTP command, and in response thereto, issues a command, "GET_INBOX_LIST", to state machine 822. State machine 822 then transitions as symbolized by path 915, to command interpretation state 920. While in this latter state, state machine 822 interprets the "GST_INBOX_LIST" command to yield a sequence of commands to IMAP client component 810 to query e-mail server 76 for the desired inbox mail list.

For this command, command interpretation state 920 will first issue, as symbolized by line 1020, a "A101 SELECT INBOX" command to the e-mail server to select the proper inbox on the e-mail server. Term "A101" (as well as similar term "A102", and so forth) is a transaction tag assigned to this particular interaction between the state machine and the e-mail server such that server responses can be paired, by the state machine, with appropriate IMAP client requests. Identical circled numerals are shown in FIGS. 9 and 10 in order for the reader to visually correlate specific inter-component messages shown in communications 1000 with their corresponding events (including state transitions) in state diagram 900. Once the "SELECT INBOX" command is issued, state machine 822 will then transition, as symbolized by line 925, to state 930 wherein the state machine will simply wait, as represented by line 934, for a response from the e-mail server as provided by IMAP client component 810. Eventually, the e-mail server responds to the "SELECT inbox" command through which, as a result, IMAP client 810 provides, as symbolized by lines 934 and 1025, an indication of the number of messages in the user's Inbox. In the example shown in FIGS. 9 and 10, the response is "*3 EXISTS" which signifies that the Inbox contains three messages. This is followed, as symbolized by line 1030, by a "A101 OK [READ-WRITE] SELECT completed" response from the IMAP Server indicating that the A101 transacting has been completed, and that the Inbox can be read or written during this session. In response, state 930 will determine if the state machine has received all the responses from the e-mail server needed to satisfy the user request or whether additional information is necessary. For the example shown, at this point in the processing, state 930 will determine that messages need to be fetched from the e-mail server. Accordingly, once the "A101 OK [READ-WRITE] SELECT completed" message is received, state 930 will transition, as symbolized by line 932, back to command interpretation state 920 for the latter state to issue subsequent IMAP commands as necessary. Illustratively, here, command interpretation state will issue, as symbolized by lines 935 and 1035, a "FETCH 1:3" command to the e-mail server to fetch the three queued messages in the Inbox. Here, tag "A102" is attached to this message to uniquely define this interaction. Included in the "FETCH" command are parameters indicating that "date" and "date from field" data from the header for each message should be fetched as well. At this point, the e-mail server issues individual fetch responses, here shown as "*1 FETCH", "*2 FETCH" and "*3 FETCH" and as represented by lines 1040, 1045 and 1050 in communication 1000, back to the e-mail front end. During this time, state machine 822 will remain in state command interpretation state 930 as indicated by line 938. Each response contains the fetched information for a corresponding e-mail message in the user's Inbox. Once all three messages have been successfully fetched, the e-mail server, as indicated by line 1055, issues an "A102 OK FETCH" message which indicates the completion of this transaction. In response to this completion message, state 930 will determine that all the necessary responses have been received from the e-mail server. Hence, state machine 900 transitions, as symbolized by line 937, to response construction state 940. Through this state, state machine 822 constructs a linked list, here list 950, that contains all the user messages supplied by the e-mail server in response to the "HTTP_GET_REQ (/Inbox)" message and provides that list back to user interaction component 826. Once this occurs, state machine 826 returns, as symbolized by line 945, back to null state 910. Once the user interaction component receives the linked list, it accesses an appropriate HTML template web page and populates that template page with the information provided in the response to yield, e.g., a page of the form shown by display page 1700 shown in FIG. 17 (with an Inbox icon in a left panel and titles to individual e-mail message in a right panel). After this page is fully constructed, the user interaction component sends, as symbolized by line 1060 in FIG. 10, that page back through multiplexor 410 to web server 350, via an "HTTP_GET_RESP" message, for transmission to user browser 15 to depict the web page providing the e-mail messages downloaded from the e-mail server. Response construction state 940 is also entered from state 930 if excess time, i.e., a timeout condition, has occurred once an IMAP command has been issued to the e-mail server without any corresponding response therefrom. As such, state 940 will specify this timeout condition to the user interaction component which, in turn, will construct and then transmit a web page to user browser 15 notifying the user of an timeout/error condition.

Not only can the user download his e-mail messages through interaction with user browser 15, but also, as discussed above, the user can move or copy selected e-mail messages from one e-mail folder to another, or delete any such messages. E-mail application module 430, including state machine 822, operates in a very similar manner as that described above, with identical states though different commands, to execute e-mail copy, move and delete operations through e-mail server 76 in response to remote user interactions through user browser 15.

Furthermore, the user can also send an outgoing e-mail message through appropriate interaction with user browser 15 and particularly using e-mail application module 430. Specifically, whenever the user clicks on "New Mail" button in area 1720 on e-mail display screen 1700 shown in FIG. 17, user interaction component 826 shown in FIG. 8 will interpret that response, as originated from user browser 15, and access a correct HTML e-mail form from stored web pages 830 and return that form, as symbolized by line 840, back to the user browser to be rendered to the user. Once the user appropriately completes the form, (s)he will click on the "Send/Rec" button in area 1720 to send the message. This interaction, originating from user browser 15 and when received by user interaction component 826 shown in FIG. 8, will cause that component to receive the form containing the e-mail from the user browser. Once the form is so received, user interaction component 826 will extract the content, including the sender and recipient addresses, of the particular e-mail message from the received form and then issue a command to state machine 822, via API 824, to send that content out to the e-mail server for transmission. This command will be a "SEND_MAIL_REQ" which will contain as a parameter the e-mail to be sent. To accomplish this, state machine 822 interacts with two components to actually send this outgoing e-mail message: SMTP (simplified mail transport protocol—conventional and not shown) and IMAP client 810. The SMTP interaction provides the e-mail message and actually instructs the e-mail server to transmit the e-mail onward to its destination. Once this interaction concludes, state machine 822 interacts with the IMAP client in order to update the "Sent Mail" folder, maintained on the e-mail server, for that particular user to include this message in its listing of sent e-mail messages. The interaction involving state machine 822, via the IMAP client, and the e-mail server is very similar to that used to read the Inbox, though different commands are used in order to write a message into the user's "Sent Mail" folder rather than read the user's "Inbox" folder. Once state machine 822 has successfully sent the e-mail to the server for transmission, the state machine then sends a positive response, i.e., an appropriate "SEND_MAIL_RESPONSE", to user interaction component 826. If this user interaction component maintains a local HTML page containing titles of all e-mails in the user's "Sent-Mail" folder, component 826 updates that HTML page to include the message that has just been sent and then supplies that page, as here symbolized by line 840, back to user browser 15 for rendering to the user. Alternatively, the user interface component can also access, as symbolized here by line 835, a predefined HTML page, from stored pages 830, that merely contains a confirmation that the e-mail message was successfully sent and provide that particular web page, here too symbolized by line 840, back to web server 350 for transmission, via HTTP, to user browser 15 for rendering to the user as appropriate visual confirmation that his(her) message was transmitted. If an external e-mail server is not used, then the IMAP client interacts with Sendmail module 360 (shown in FIG. 3A) instead.

Though we have described the interaction for both the file sharing and e-mail application modules as illustratively user-initiated, i.e., starting with a user request entered at user browser 15, the interaction can be server-initiated as well, with either file server 78 or e-mail server 76, via SAMBA component 510 or IMAP client 810, respectively. In this case, as will be described below in connection with RDP client 1100 (in conjunction with FIG. 12B), a server-initiated request will be directed to the corresponding state machine, be processed by that state machine, and if appropriate, forward resulting data onward to the corresponding user interaction component to be incorporated into an appropriate web page and then transmitted to user browser 15 for rendering to the remote user. Alternatively, in some cases, once the state machine has processed the request, the state machine may, depending on the nature of the data supplied by the server, generate further commands to the server. Though the specific commands and transition events will likely vary, the state processing will be quite similar to that shown and described herein.

Figure 11:
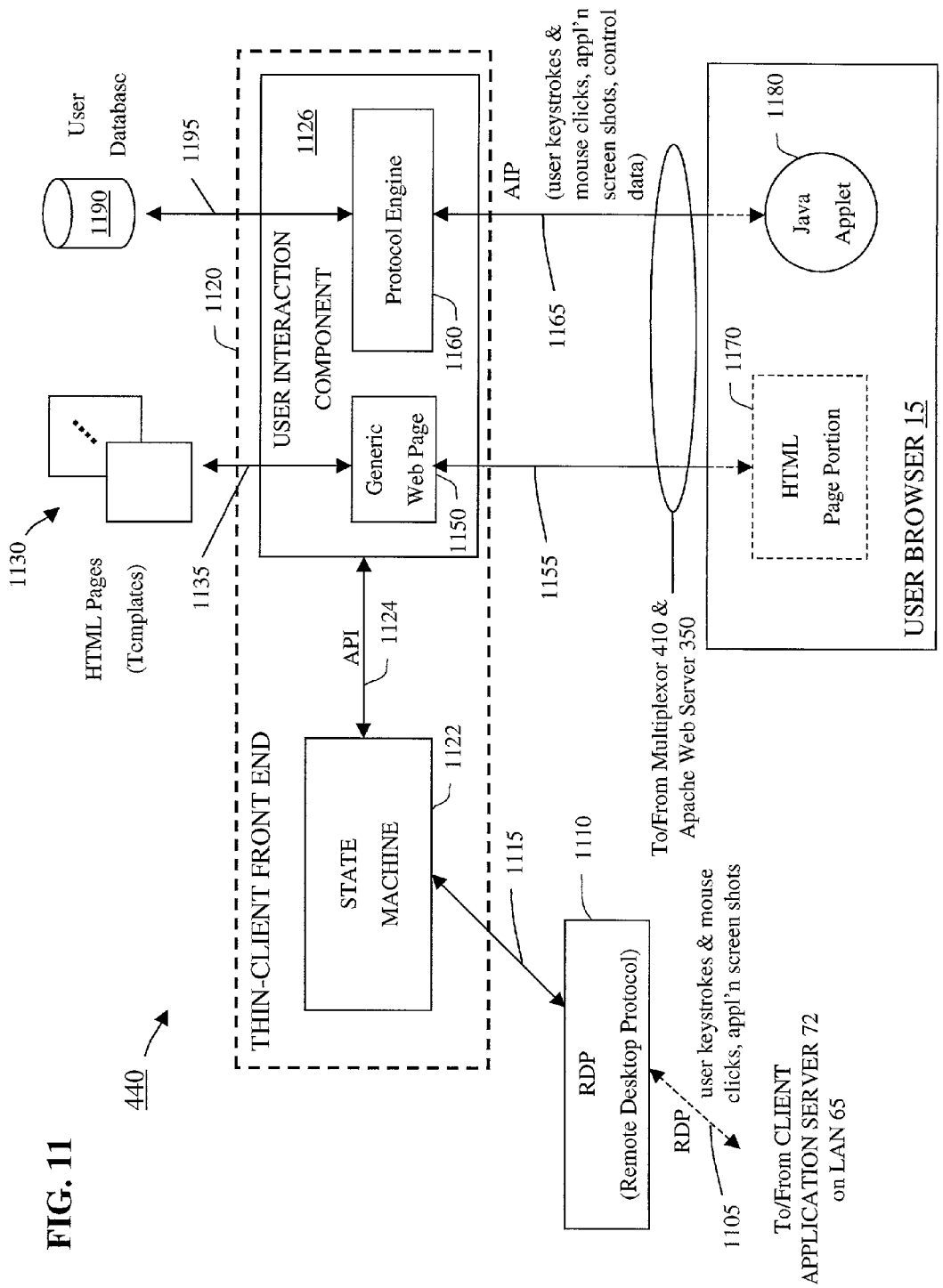
FIG. 11 depicts a block diagram of thin-client application module 440 that forms a part of software 400 shown in FIG. 4.

FIG. 11 depicts a block diagram of thin-client application module 440 that forms a part of software 400 shown in FIG. 4. As noted above, module 440 interacts through the remote desktop protocol (RDP) with a client application program then being hosted on server 70. Module 440 receives user mouse clicks and keystrokes from the user browser, in AIP form or some other similar form, and passes that information, via RDP, to the client application program to control its execution. In return, this module obtains graphical output displays, as screen shots, generated by the client application program and in RDP form, and converts those screen shots into AIP form and then transmits AIP messages, containing the screen shots, back to the user, specifically the user browser for rendering thereat. Note that module 440 can also receive control information from the user browser via AIP or some similar protocol. This information will typically not require any interaction with the application server via RDP. For example, thin-client Java applet 1180 running within the browser could request from the SEP a list of the applications that the user has access to at startup time. Based on the response, applet 1180 would display icons representing these applications. This whole interaction would occur via the AIP (or some similar protocol). Alternatively, based on implementational considerations, such control interactions could also use a completely separate protocol from the data interactions such as keystrokes, mouse clicks, and screen updates.

Module 440 contains RDP component 1110, thin-client front end component 1120, stored HTML pages 1130 and user database 1190.

Thin-client front end 1120 is itself formed of state machine 1122 and user interaction component 1126 which communicate with each other through an application programming interface (API) as symbolized by line 1124. State machine 1122, in a similar fashion to state machines 522 and 822 (in file sharing front end 520 and e-mail front end 820 shown in FIGS. 5 and 8, respectively), interacts with an RDP client component 1110 which, in turn, interacts with client applications server 72. User interaction component 1126, in a similar manner to user interaction components 526 and 826 (in file sharing front end 520 and e-mail front end 820 shown in FIGS. 5 and 8, respectively), interacts with user browser 15 and passes and receives application information to and from the state machine. Protocol engine 1160, discussed below, receives user interaction data, i.e., user mouse clicks and keystrokes in the form of AIP messages, from user browser 15 that are related to a client application program then executing on server 72 and sends screen updates to the user browser for display thereat.

RDP component 1110 is conventional and implements a client side of the RDP. Specifically, it interacts directly with client application server 72 using RDP by translating commands from a format used by state machine 1122 into the RDP for application to server 72 and translating responses received from this server into an appropriate format for use by state machine 1122.

User interaction component 1126 contains generic web page module 1150 and protocol engine 1160. Generic web page module 1150 responds to a request from the user, and specifically user browser 15, that does not directly involve the execution of a thin-client application program. For example, when the user first clicks on the "My Apps" tab, an HTML page that contains a Java applet that controls input/output to executing thin-client application programs, using the AIP protocol, is downloaded to the browser and then instantiated under the browser to become Java applet 1180.

As shown in FIG. 11, user interaction data in the form of user mouse clicks and keystrokes is provided by user browser 15 and specifically through execution of conventional internal Java applet 1180 that encodes this data into the AIP protocol. Additionally, control information is passed between the Java applet and the SEP to enable the applet to, for example, correctly display the icons for the client application programs that a particular user can access. For the discussion that follows, this control data is also sent via the AIP protocol. In general, this data could be sent by the same protocol as is used for transfer of the user interaction data in the form of mouse clicks and keystrokes, or by some alternate protocol.

In any event, user interaction component 1120 obtains, as symbolized by line 1165, AIP message data incoming from multiplexor 15. This message can take the form of a message indicating that a user has clicked on one of his(her) displayed client application program icons to invoke that particular application. Protocol engine 1160 within component 1126 extracts the interaction data from the AIP message and applies it to state machine 1122. The state machine, in turn, provides, as symbolized by line 1115, this command to RDP component 1110 which converts it into a corresponding RDP message. Component 1110 then sends that RDP message, over the LAN and as symbolized by dashed line 1105, to client application server 72. Server 72 then extracts the interaction data from the RDP message and applies it to the corresponding client application program then executing, or in the case of a user initially clicking on a client application program icon displayed by the user browser, launches that application on the server. The resulting graphical display produced by the application is then returned by the server, within an RDP message and also as symbolized by dashed line 1105, back to RDP component 1110. This component, in turn, provides the display data to state machine 1122. The state machine will react accordingly and provide that data, via API 1124, to user interaction component 1126. This component, through protocol engine 1160, converts that display data (screen shot) into an AIP message and then transmits that message, via multiplexor 410 and web server 350, to user browser 15 to update the application display then being rendered thereat. Within the browser, Java applet 1180 converts the AIP message into an appropriate display to the user within the window assigned for this particular instance of the remotely executing client application program.

Protocol engine 1160 does not always need to interact with state machine 1122. For example, when Java applet 1180 sends a request to the protocol engine for a list of client application programs to which the user can access (via the control portion of the AIP protocol or via a separate control protocol), the protocol engine can refer, as symbolized by line 1195, to local user database 1190 for that application list. Once the list is returned to engine 1160, that engine, in turn, will instruct the Java applet as to which specific applications to graphically display to the user. Alternatively, rather than accessing local user database 1190, protocol engine 1160 could access a non-local database through a conventional protocol, such as LDAP.

Figure 18:
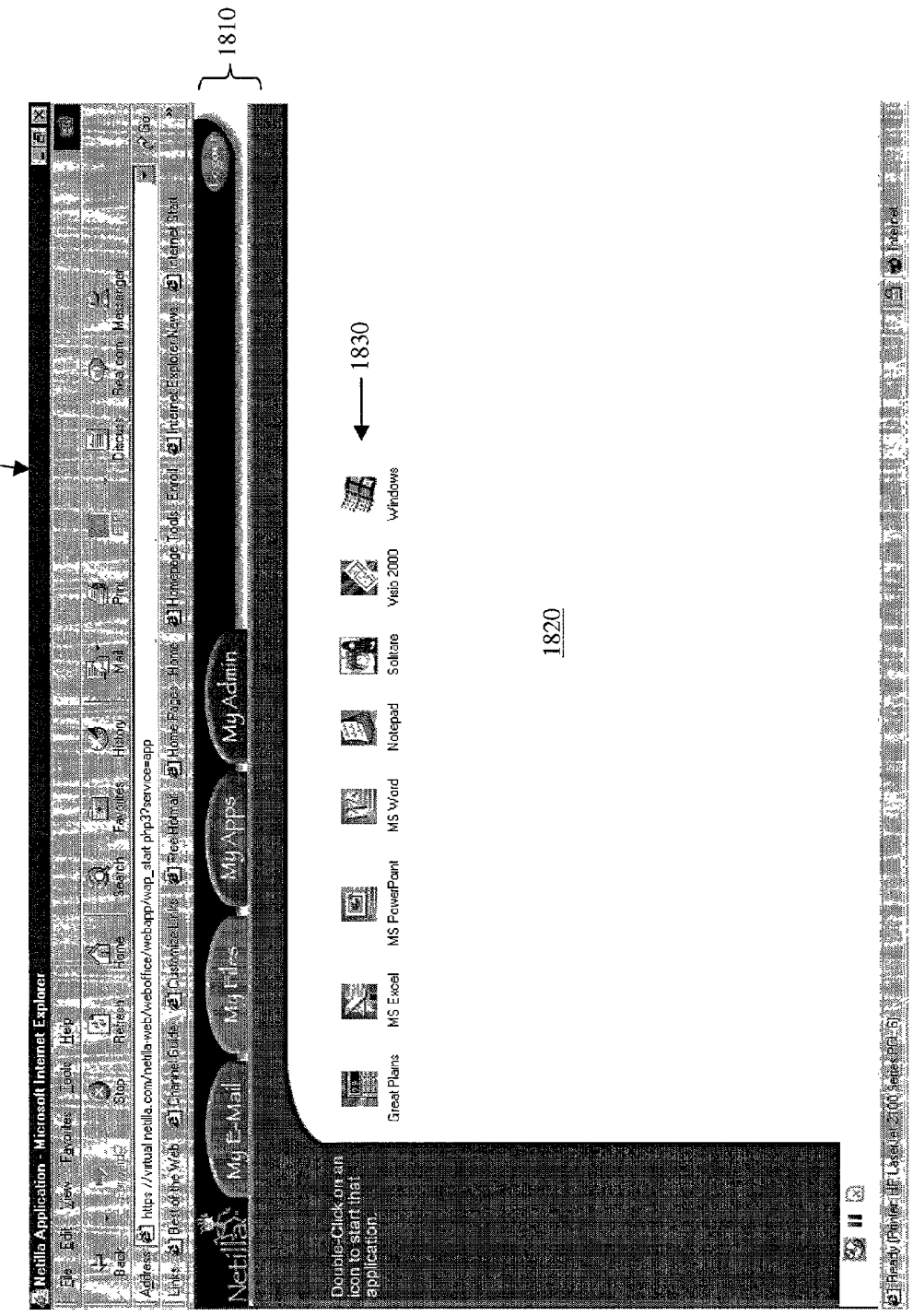
FIG. 18 depicts actual screen shot 1800 of a typical display screen rendered at user browser 15, shown in FIG. 1, through which a remote user, through thin-client application program support capability of the present invention, can remotely execute his(her) client application programs hosted on client application server 72.

When the user clicks on the "My Apps" tab as displayed by user browser 15 in order to invoke thin-client application program hosting, a display similar to that shown in screen shot 1800 depicted in FIG. 18 is rendered as a result. Visual feedback of that selection is again illustratively provided through a highlighted background for this tab in display region 1810. Those specific client application programs to which the user can access are displayed through separate graphical icons 1830 situated in display area 1820. The user can then click on any of these icons to remotely launch the associated client application program in a separate browser window through which the user can fully interact with that application.

Figure 12A:
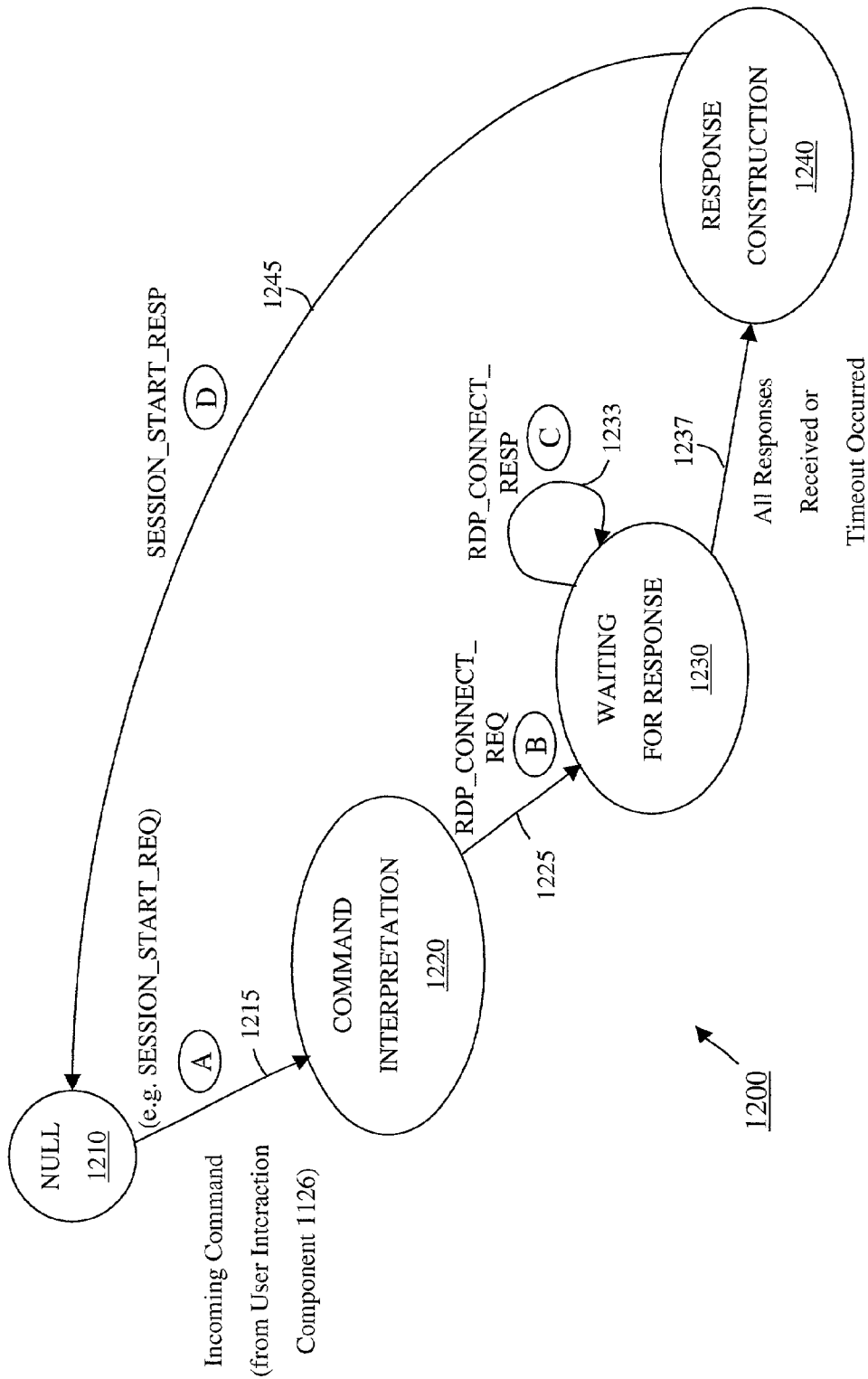
FIG. 12A depicts state diagram 1200 for state machine 1122 shown in FIG. 11 for those states associated with a user-initiated interaction with thin-client application server 72, shown in FIG. 1, to start a client application session.
Figure 12B:
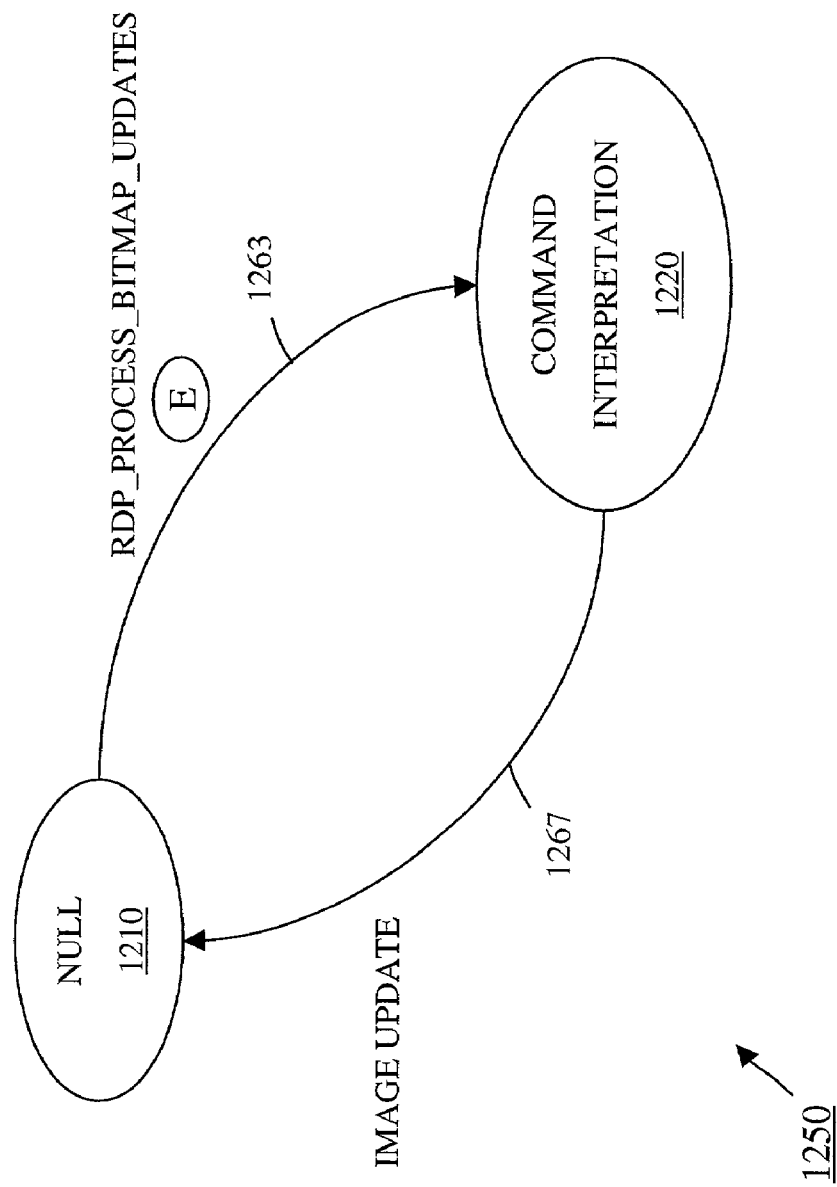
FIG. 12B depicts state diagram 1250 for state machine 1122 shown in FIG. 11 for those states associated with an interaction initiated by client application server 72, shown in FIG. 1, specifically to update a display screen on user browser 15 for an executing thin-client application program.
Figure 13:
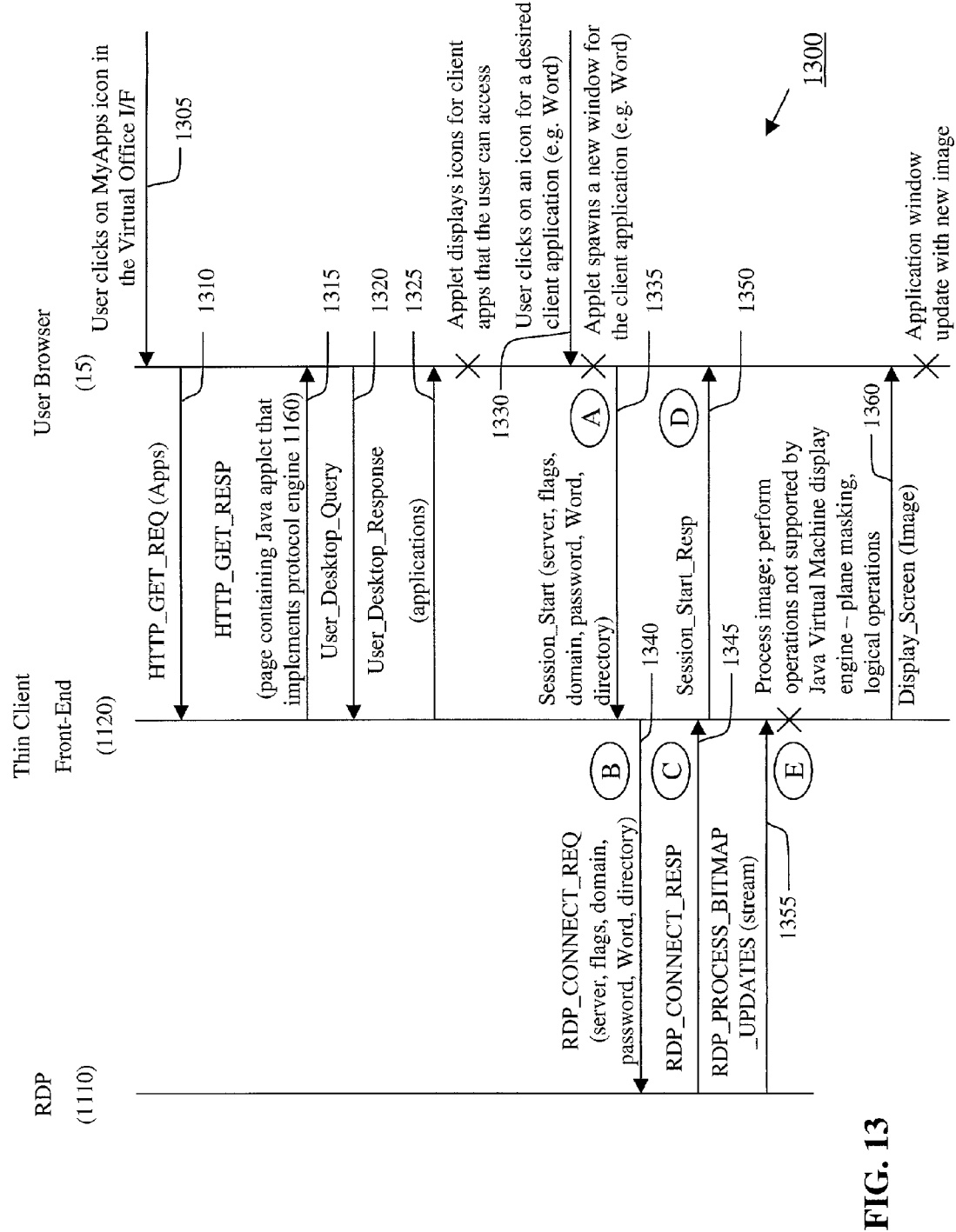
FIG. 13 depicts illustrative inter-process communication that involves thin-client application module 440, operative in conjunction with client application server 72 (shown in FIG. 1), for remotely executing a thin-client application program at server 72 and displaying graphical results therefrom on user browser 15.

To gain improved understanding of the operation of thin-client application module 440, the reader should now simultaneously refer to FIGS. 12A, 12B and 13.

FIGS. 12A and 12B depict state diagrams 1200 and 1250 for thin-client front-end state machine 1122 for user- and server-initiated interactions, respectively. The user-initiated interaction involves, e.g., startup of a client application program session, in response to a user command provided from user interaction component 1126; the server-initiated interaction involves, e.g., an update, provided by client application server 72 and via RDP component 1110, to an application display then being rendered by user browser 15. FIG. 13 depicts illustrative inter-process communication 1300 that involves thin-client module 440, operative in conjunction with the client application server 72, for executing and interacting with hosted client application programs.

As shown, state machine 1122 contains four distinct states (similar to those in state diagrams 600 and 900 shown in FIGS. 6 and 9 for state machine 522 and 822 in file sharing application module 420 and e-mail application module 430, respectively): null state 1210, command interpretation state 1220, waiting for response state 1230 and response construction state 1240.

Initially, state machine 1122 resides in null state 1210. One a user clicks on the "My Apps" icon in the Netilla virtual office graphical interface (e.g., displays 1600, 1700 or 1800 shown in FIGS. 16, 17 and 18, respectively), this operation being symbolized by line 1305, user browser 15 issues, as symbolized by line 1310, an appropriate HTTP request instruction ("HTTP_GET_REQ (/Apps)") to fetch a list of the client application programs which that user can access. User interaction component 1126 receives this command, and in response thereto, issues, as symbolized by line 1315, an HTTP_GET_RESP message containing an HTML page with an embedded Java applet. Once downloaded into user browser 15, this Java applet is instantiated by the browser as Java applet 1180 (see FIG. 11) and then issues, as symbolized by line 1320, a query, "User_Desktop_Query", to thin-client front end 1120 for a list of the user's accessible hosted client application programs. As a result of this query, component 1126 in thin-client front end 1120 returns, as symbolized by line 1325 (in FIG. 13), a response, "User_Desktop_Response", based on stored user information contained within user database 1190, containing a list of those application programs. Thereafter, Java applet 1180 executing in the browser displays an icon on user browser 15 for each of these application programs. At this point, the user, being provided with a graphical display such as display 1800 shown in FIG. 18, can click on any of these icons to invoke the corresponding client application program.

If the user then clicks on any such icon, e.g., that associated with the MICROSOFT® WORD™ program (a word processing application software), this interaction being symbolized by line 1330, Java applet 1180 spawns a new browser window (which the applet controls) for use as a user display area for that particular remotely hosted application program. In addition, then user browser 15 provides, as symbolized by line 1335, a "Session_Start" command to thin-client front end 1120. This command includes the name of an application server (server 72 as shown in FIG. 1), appropriate flags, a domain within which the application server runs, password of the user, the name of the application program (here "Word"), a name of a working directory and other related parameters needed to properly and remotely execute the application program (including fully defining its user environment).

In response to the "Session_Start" command, state machine 1200 transitions, as symbolized by line 1215 in FIG. 12A, from null state 1210 to command interpretation state 1220 where it processes this command. Similar to FIGS. 9 and 10, identical circled letters, rather than numerals, are shown in FIGS. 12A, 12B and 13 in order for the reader to visually correlate specific inter-component messages shown in communications 1300 with their corresponding events (including state transitions) in state diagrams 1200 and 1250. Specifically, while in state 1220, the state machine issues, as symbolized by line 1340, an "RDP_CONNECT_REQ" request message to client RDP component 1110 to request a session with a particular client application server. This request contains, e.g., the server, directory, application program (e.g., MICROSOFT® WORD™, a word processing application software,) and other information provided, in the Session_Start command, to the thin-client front end. Once this message is issued, state machine 1200 transitions, as indicated by line 1225, to waiting for response state 1230, waiting for a response from the client application server, e.g., server 72 shown in FIG. 1.

Once the server has established the requested application session, the server issues an appropriate message to client RDP component 1110 as shown in FIGS. 12A and 13, which, in turn, provides, as symbolized by line 1340, an RDP connect response message, "RDP_CONNECT_RESP", to the thin-client front end. In response to this RDP message, state machine 1122 remains, as symbolized by line 1233, in this state to determine if this is the only response that the state machine has been expecting from the client application server or not. If it is, as is the case here for session startup, then state machine 1122 transitions, as indicated by line 1237, from state 1230 to response construction state 1240. Once in the latter state, state machine 1122 constructs an appropriate session start response message. i.e., "SESSION_START_RESP", to user interaction component 1126 after which the state machine transitions back, as symbolized by line 1245, back to null state 1210. As a result of this response message, the user interaction component sends a "Session_Start_Resp" message, as symbolized by line 1350, to user browser 15 and specifically to Java applet 1180 executing thereunder to indicate that the desired application session has been established. In essentially the same manner as just described, subsequent user-initiated interactions, i.e., mouse clicks and keystrokes, with the executing application program will be provided by the user browser and processed through the thin-client front end and translated from AIP into appropriate RDP messages which, in turn, are provided to client application server 72 to control execution of that application program.

Returning to the example shown in FIG. 13 for startup of an remotely hosted thin-client application program session, once the application session has been established and the application invoked at server 72, the server will provide RDP client component 1110 with an initial graphical display screen. In response, RDP component 1110 will issue, as symbolized by line 1355, an "RDP_PROCESS_BITMAP_UPDATES (stream)" message containing screen bitmap display data for display. In response to this RDP message, state machine 1122 will transition, as symbolized by line 1263 in FIG. 12B, from null state 1210 to command interpretation state 1220. In this latter state, the state machine will simply pass this bitmap data onward to user interaction component 1126 within thin-client front end 1120 such that this data can be forwarded to the user browser for rendering thereat. As such, state machine 1122 will issue, as symbolized by line 1360, an image update command, "IMAGE UPDATE", to the user interaction component, and, as symbolized by line 1267, transition back to null state 1210. In response to this state machine command, the user interaction component performs certain initial processing of this bitmap data. In particular, given limited display capabilities of a Java virtual machine executing in user browser 15, this processing includes operations not supported by that virtual machine, such as, e.g., plane masking, logical operations and others. In addition, the user interaction component, through use of protocol engine 1160, will also determine if Java applet 1180 has cached any portion of the display that can be reused in the updated display, e.g., a glyph representing a character, hence eliminating a need to resend that portion so as to conserve transmission bandwidth and expedite update time by user browser 15. At the conclusion of this processing, user interaction component 1126 within thin-client front end 1120 will send, as symbolized by line 1160, a "Display_Screen (Image)" message containing the update display data to user browser 15 for rendering thereat in the corresponding window spawned to support this particular client application program. In the same manner as described, subsequent server-initiated interactions, i.e., bitmap display screens, for this program will be provided by client application server 72 and processed through the thin-client front end and translated from RDP into appropriate AIP messages which, in turn, are provided to user browser 15 to appropriately update the display in the corresponding application window.

Though we have described client interaction component 1126 as utilizing protocol engine 1160 and user browser 15 as utilizing Java applet 1180, both to support the AIP protocol in order to advantageously increase bandwidth efficiency, these components could use native RDP all the way to the user browser.

Furthermore, though we have described our invention as providing remote office functionality in terms of file access, e-mail and thin-client application hosting, our inventive teachings can be used with any other additional office-based application that is to be provided to remote users over a network connection via a browser. In that regard, another application module would be implemented and incorporated into virtual office software 400 shown in FIG. 4—and similar to those described above—to provide necessary bi-directional, real-time protocol translation of user interaction data in secure HTTP (or a particular transmission protocol, if used in lieu of secure HTTP) into a particular protocol used by that other office-based application, and convert resulting output data (whether graphical or in another form) provided by that application-specific protocol into secure HTTP (or the intermediate transmission protocol) for transmission to the user browser and rendering, as a web page, to the user situated thereat. As such, by now, the reader can clearly appreciate that our inventive teachings are not limited to merely providing remote access to just office-based file access, e-mail and thin-client application hosting functions, though these functions are likely to be those most often appearing and needed in the processing environments for which the present invention will likely see use.

Although a single embodiment, with various modifications, which incorporates the teachings of the present invention has been shown and described in considerable detail herein, those skilled in the art can readily devise many other embodiments that still utilize these teachings.

We claim:

1. Apparatus for providing a web-accessible virtual processing environment to a network-connected office server for a remotely connected user computer through which a user stationed at the computer can execute any of a plurality of server-based applications resident at the office server, comprising:

a platform, capable of being situated in network communication between the user computer and the office server, having:
  a processor;
  a memory connected to the processor and for storing computer executable instructions therein;
  first and second network interfaces, operable in conjunction with the processor, for interfacing the platform, through the first network interface, to a wide area network (WAN) connection through which the remote user computer obtains connectivity to the platform, and, through the second network interface, to a local area network (LAN) having a server computer electrically communicative thereover, respectively, with the server computer forming the office server; and
  wherein, in response to the executable instructions, the processor, for each one of the server-based applications:
    provides, through a corresponding client application module implemented on the platform for each of the server-based applications, bi-directional protocol conversion of messages between the remote user computer and the office server, such that user interaction data, intended for a specific one of the server-based applications and provided by a browser executing on the remote user computer in a first protocol, is converted into a second protocol associated with said one server-based application and then applied to the server-based application at the office server, and output data, provided by said specific one server-based application, is converted from the second protocol to the first protocol for being transmitted to the user computer and graphically rendered thereat, through the browser, to the user; and
  wherein, in response to the executable instructions, the processor:
    for messages emanating from the user computer and appearing on the WAN connection:
      receives, from the browser, a first message containing the user interaction data associated with a specific one server-based application and in the first protocol;
      converts the user interaction data in the first protocol to the second protocol associated with the specific one server-based application to yield a second message; and
      applies the second message, as input, to the server computer for processing by the specific one server-based application; and
    for messages emanating from the server computer and appearing on the LAN:
      receives, from the server computer and over the LAN connection, a third message containing output data generated by the specific one server-based application and in the second protocol;
      converts the output data message in the second protocol to the first protocol to yield a fourth message; and
      applies the fourth message to the WAN connection for transmission to the browser in order to render the output data thereat.

2. The apparatus in claim 1 wherein the server computer comprises a corresponding server for each of the server-based applications and is implemented either coincident with the platform or as at least one physical computer separate from the platform and connected, via the LAN, to it.

3. Apparatus for providing a web-accessible virtual processing environment to a network-connected office server for a remotely connected user computer through which a user stationed at the computer can execute any of a plurality of server-based applications resident at the office server, comprising:
  a platform, capable of being situated in network communication between the user computer and the office server, having:
    a processor;
    a memory connected to the processor and for storing computer executable instructions therein;
    first and second network interfaces, operable in conjunction with the processor, for interfacing the platform, through the first network interface, to a wide area network (WAN) connection through which the remote user computer obtains connectivity to the platform, and, through the second network interface, to a local area network (LAN) having a server computer electrically communicative thereover, respectively, with the server computer forming the office server; and
  wherein, in response to the executable instructions, the processor, for each one of the server-based applications:
    provides, through a corresponding client application module implemented on the platform for each of the server-based applications, bi-directional protocol conversion of messages between the remote user computer and the office server, such that user interaction data, intended for a specific one of the server-based applications and provided by a browser executing on the remote user computer in a first protocol, is converted into a second protocol associated with said one server-based application and then applied to the server-based application at the office server, and output data, provided by said specific one server-based application, is converted from the second protocol to the first protocol for being transmitted to the user computer and graphically rendered thereat, through the browser, to the user;
  wherein the processor, in response to execution of the stored instructions:
  for messages emanating from the user computer and appearing on the WAN connection:
    receives, from the browser, a first message containing the user interaction data associated with a specific one server-based application and in the first protocol;
    converts the user interaction data in the first protocol to the second protocol associated with the specific one server-based application to yield a second message; and
    applies the second message, as input, to the server computer for processing by the specific one server-based application; and
  for messages emanating from the server computer and appearing on the LAN:
    receives, from the server computer and over the LAN connection, a third message containing output data generated by the specific one server-based application and in the second protocol;
    converts the output data message in the second protocol to the first protocol to yield a fourth message; and applies the fourth message to the WAN connection for transmission to the browser in order to render the output data thereat;

wherein the server computer comprises a corresponding server for each of the server-based applications and is implemented either coincident with the platform or as at least one physical computer separate from the platform and connected, via the LAN, to it;

the apparatus further comprising, in the platform, a separate corresponding software-implemented application module for each of the specific server-based applications for providing protocol translation of the user interaction data and output data between the first and second protocols; the application module comprises:

a user interaction component communicative, through the WAN connection, with the browser, for accepting the user interaction data from the browser in the first protocol and for providing said output data to the browser in the first protocol;

a state machine, communicative through an application processing interface with the user interaction component, for interpreting each command issued by the user interaction component so as to provide the user interaction data to the specific one server-based application executing on the server computer, and communicative through a client protocol component, for sending user interaction data to the server-based application and for receiving said output information from the specific one server-based application; and a client protocol component, operative in conjunction with the state machine, for converting the user interaction data received from the state machine into the second protocol and applying resultant messages in the second protocol to the specific one server-based application, and for receiving said output data in the second protocol from the specific one server-based application and applying said output data to the state machine.

4. The apparatus in claim 3 wherein the server-based applications comprise thin-client application hosting, e-mail and shared file access; and the first protocol comprises HTTP, secure HTTP, or a protocol with AIP-like functionality and the second protocol comprises RDP (remote desktop protocol), IMAP (Internet mail access protocol) or SMB (server message block).

5. The apparatus in claim 4 wherein the user interaction data comprises a designation of a uniform resource locator (URL), uniform resource identifier (URI), form input, keystrokes or mouse clicks that returns associated information desired by the user, and output data comprises graphical display data.

6. The apparatus in claim 5 wherein said output data comprises bitmap graphic output display data generated by the specific one server-based application.

7. The apparatus in claim 6 wherein the WAN connection comprises either a private network connection or an Internet connection.

8. The apparatus in claim 7 wherein the second network interface comprises an Ethernet interface, and the first network interface comprises a broadband network interface.

9. The apparatus in claim 8 wherein the broadband network interface comprises a digital subscriber line (DSL) interface, a cable modem, an integrated services digital network (ISDN) interface, a T1 interface or a fractional T1 interface.

10. A method for use, in apparatus, which provides for providing a web-accessible virtual processing environment to a network-connected office server for a remotely connected user computer through which a user stationed at the computer can execute any of a plurality of server-based applications resident at the office server, the apparatus comprising a platform, capable of being situated in network communication between the user computer and the office server, having: a processor, a memory connected to the processor and for storing computer executable instructions therein; first and second network interfaces, operable in conjunction with the processor, for interfacing the platform, through the first network interface, to a wide area network (WAN) connection through which the remote user computer obtains connectivity to the platform, and, through the second network interface, to a local area network (LAN) having a server computer electrically communicative thereover, respectively, with the server computer forming the office server; wherein, the method comprises the steps, performed by the processor, for each one of the server-based applications:

providing, through a corresponding client application module implemented on the platform for each of the server-based applications, bi-directional protocol conversion of messages between the remote user computer and the office server, wherein the providing step comprises the steps of:

converting user interaction data, intended for a specific one of the server-based applications and provided by a browser executing on the remote user computer from a first protocol into a second protocol associated with said one server-based application so as to yield converted user interaction data;

applying the converted user interaction data to the server-based application at the office server;

converting output data, provided by said specific one server-based application, from the second protocol to the first protocol so as to yield converted output data; and transmitting the converted output data to the user computer to be graphically rendered thereat, through the browser, to the user; and for messages emanating from the user computer and appearing on the WAN connection:

receiving, from the browser, a first message containing the user interaction data associated with a specific one server-based application and in the first protocol;

converting the user interaction data in the first protocol to the second protocol associated with the specific one server-based application to yield a second message; and applying the second message, as input, to the server computer for processing by the specific one server-based application; and for messages emanating from the server computer and appearing on the LAN:

receiving, from the server computer and over the LAN connection, a third message containing output data generated by the specific one server-based application and in the second protocol;

converting the output data message in the second protocol to the first protocol to yield a fourth message; and applying the fourth message to the WAN connection for transmission to the browser in order to render the output data thereat.

11. The method in claim 10 further comprising the step of implementing a corresponding server for each of the server-based applications either coincident with the platform or as at least one physical computer separate from the platform and connected, via the LAN, to it.

12. A method for use, in apparatus, which provides for providing a web-accessible virtual processing environment to a network-connected office server for a remotely connected user computer through which a user stationed at the computer can execute any of a plurality of server-based applications resident at the office server, the apparatus comprising a platform, capable of being situated in network communication between the user computer and the office server, having: a processor, a memory connected to the processor and for storing computer executable instructions therein; first and second network interfaces, operable in conjunction with the processor, for interfacing the platform, through the first network interface, to a wide area network (WAN) connection through which the remote user computer obtains connectivity to the platform, and, through the second network interface, to a local area network (LAN) having a server computer electrically communicative thereover, respectively, with the server computer forming the office server; wherein, the method comprises the steps, performed by the processor, for each one of the server-based applications:

providing, through a corresponding client application module implemented on the platform for each of the server-based applications, bi-directional protocol conversion of messages between the remote user computer and the office server, wherein the providing step comprises the steps of:

converting user interaction data, intended for a specific one of the server-based applications and provided by a browser executing on the remote user computer from a first protocol into a second protocol associated with said one server-based application so as to yield converted user interaction data;

applying the converted user interaction data to the server-based application at the office server;

converting output data, provided by said specific one server-based application, from the second protocol to the first protocol so as to yield converted output data; and transmitting the converted output data to the user computer to be graphically rendered thereat, through the browser, to the user; and for messages emanating from the user computer and appearing on the WAN connection:

receiving, from the browser, a first message containing the user interaction data associated with a specific one server-based application and in the first protocol;

converting the user interaction data in the first protocol to the second protocol associated with the specific one server-based application to yield a second message; and applying the second message, as input, to the server computer for processing by the specific one server-based application; and for messages emanating from the server computer and appearing on the LAN:

receiving, from the server computer and over the LAN connection, a third message containing output data generated by the specific one server-based application and in the second protocol;

converting the output data message in the second protocol to the first protocol to yield a fourth message; and applying the fourth message to the WAN connection for transmission to the browser in order to render the output data thereat;

implementing a corresponding server for each of the server-based applications either coincident with the platform or as at least one physical computer separate from the platform and connected, via the LAN, to it; and providing protocol translation of the user interaction data and output data between the first and second protocols through a separate software-implemented application module for each of the specific server-based applications; wherein the application module comprises:

a user interaction component communicative, through the WAN connection, with the browser, for accepting the user interaction data from the browser in the first protocol and for providing said output data to the browser in the first protocol;

a state machine, communicative through an application processing interface with the user interaction component, for interpreting each command issued by the user interaction component so as to provide the user interaction data to the specific one server-based application executing on the server computer, and communicative through a client protocol component, for sending user interaction data to the server-based application and for receiving said output information from the specific one server-based application; and a client protocol component, operative in conjunction with the state machine, for converting the user interaction data received from the state machine into the second protocol and applying resultant messages in the second protocol to the specific one server-based application, and for receiving said output data in the second protocol from the specific one server-based application and applying said output data to the state machine.

13. The method in claim 12 wherein the server-based applications comprise thin-client application hosting, e-mail and shared file access; and the first protocol comprises HTTP, secure HTTP, or a protocol with AIP-like functionality and the second protocol comprises RDP (remote desktop protocol), IMAP (Internet mail access protocol) or SMB (server message block).

14. The method in claim 13 wherein the user interaction data comprises a designation of a uniform resource locator (URL), uniform resource identifier (URI), form input data, user keystrokes or user mouse clicks that returns associated information desired by the user, and the output data comprises graphical display data.

15. The method in claim 14 wherein said output data comprises bitmap graphic output display data generated by the specific one server-based application.

16. The method in claim 15 wherein the WAN connection comprises either a private network connection or an Internet connection.

17. The method in claim 16 wherein the second network interface comprises an Ethernet interface, and the first network interface comprises a broadband network interface.

18. The method in claim 17 wherein the broadband network interface comprises a digital subscriber line (DSL) interface, a cable modem, an integrated services digital network (ISDN) interface, a T1 interface or a fractional T1 interface.

* * * * *